United States Patent
Melendy et al.

(10) Patent No.: US 9,806,620 B2
(45) Date of Patent: Oct. 31, 2017

(54) MULTI-PHASE HYSTERETIC BUCK SWITCHING REGULATOR

(71) Applicant: Avago Technologies General IP (Singapore) Pte. Ltd., Singapore (SG)

(72) Inventors: Daniel Melendy, Fort Collins, CO (US); Mark Rutherford, Wellington, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 27 days.

(21) Appl. No.: 15/068,000

(22) Filed: Mar. 11, 2016

(65) Prior Publication Data

US 2016/0268904 A1    Sep. 15, 2016

Related U.S. Application Data

(60) Provisional application No. 62/305,372, filed on Mar. 8, 2016, provisional application No. 62/132,268, filed on Mar. 12, 2015.

(51) Int. Cl.
  *H02M 3/158* (2006.01)

(52) U.S. Cl.
  CPC .. *H02M 3/1584* (2013.01); *H02M 2003/1586* (2013.01)

(58) Field of Classification Search
  CPC ........ H02M 3/10; H02M 3/135; H02M 3/155; H02M 3/156; H02M 3/157; H02M 3/1563; H02M 3/1584; H02M 2001/0012; G05F 1/462; G05F 1/56; G05F 1/575
  USPC ....... 323/265, 271, 280, 282, 283, 284, 351; 363/72
  See application file for complete search history.

(56) References Cited

U.S. PATENT DOCUMENTS

| 5,193,054 A * | 3/1993 | Galloway ................. H02J 4/00 307/82 |
| 9,246,391 B2 * | 1/2016 | Berghegger ...... H02M 3/33507 |
| 2004/0123167 A1 * | 6/2004 | Chapuis .................. H02J 1/102 713/300 |
| 2010/0013305 A1 * | 1/2010 | Heineman ............... H02J 1/102 307/31 |
| 2010/0201405 A1 * | 8/2010 | Ahmad ............... H02M 3/1584 327/108 |
| 2012/0026754 A1 * | 2/2012 | Ye ......................... H02M 3/285 363/17 |

(Continued)

OTHER PUBLICATIONS

Li, Pengfei, "Synchronization and Control of High Frequency DC-DC Converters", A Dissertation Presented to the Graduate School of the University of Florida in Partial Fulfillment of the Requirements for the Degree of Doctor of Philosophy, University of Florida, 2009, pp. 1-141.

(Continued)

*Primary Examiner* — Adolf Berhane
(74) *Attorney, Agent, or Firm* — Sterner, Kessler, Goldstein & Fox P.L.L.C.

(57) ABSTRACT

Methods, systems, circuits, devices, and apparatuses are described for multi-phase hysteretic buck switching regulators. Systems, circuits, devices, and apparatuses for multi-phase hysteretic buck switching regulators may include master phase components, multi-phase delay generators, and one or more slave phase components. Methods for multi-phase hysteretic buck switching regulation are also provided.

20 Claims, 11 Drawing Sheets

(56) References Cited

U.S. PATENT DOCUMENTS

| | | | |
|---|---|---|---|
| 2012/0091977 A1* | 4/2012 | Carroll | H02M 3/1584 323/271 |
| 2012/0218792 A1* | 8/2012 | Ziegler | H02M 3/1584 363/84 |
| 2012/0268026 A1* | 10/2012 | Crawford | H05B 33/0815 315/210 |
| 2014/0375288 A1* | 12/2014 | Nora | H02M 3/1584 323/272 |
| 2015/0263617 A1* | 9/2015 | Xue | H02M 3/156 323/271 |

OTHER PUBLICATIONS

Li, Pengfei, et al., "A Delay Locked Loop Synchronization Scheme for High Frequency Multiphase Hysteretic DC-DC converters", Symposium on VLSI Circuits Digest of Technical Papers, 2007, pp. 26-27.

* cited by examiner

800 → 802 Dynamically activate a slave phase circuit or dynamically deactivate a slave phase circuit

| CONFIG<2:0> | 0 | 1 | 2 | 3 | 4 | 5 |
|---|---|---|---|---|---|---|
| Switcher 1 | Single | 2 Phase | Single | 2 Phase | 3 Phase | 4 Phase |
| Switcher 2 | Single | | Single | | | |
| Switcher 3 | Single | Single | 2 Phase | | 3 Phase | |
| Switcher 4 | Single | Single | | | | Single |

MODE = 3

| CONFIG<2:0> | 0 | 1 | 2 | 3 | 4 | 5 |
|---|---|---|---|---|---|---|
| Switcher 1 | Single | 2 Phase | Single | 2 Phase | 3 Phase | 3 Phase |
| Switcher 2 | Single | | Single | | | |
| Switcher 3 | Single | Single | 2 Phase | 2 Phase | Single | Off |
| Switcher 4 | Single | Single | | | | |

MODE = 2

| CONFIG<2:0> | 0 | 1 | 2 | 3 | 4 | 5 |
|---|---|---|---|---|---|---|
| Switcher 1 | Single | 2 Phase | Single | 2 Phase | 2 Phase | 2 Phase |
| Switcher 2 | Single | | Single | | Off | Off |
| Switcher 3 | Single | Single | 2 Phase | 2 Phase | 2 Phase | 2 Phase |
| Switcher 4 | Single | Single | | | Single | Off |

MODE = 1

| CONFIG<2:0> | 0 | 1 | 2 | 3 | 4 | 5 |
|---|---|---|---|---|---|---|
| Switcher 1 | Single | Single | Single | Single | Single | Single |
| Switcher 2 | Single | Off | Single | Off | Off | Off |
| Switcher 3 | Single | Single | 2 Phase | 2 Phase | Single | Single |
| Switcher 4 | Single | Single | | | | |

MODE = 0

MODE = 1

| CONFIG<2:0> | 0 | 1 | 2 | 3 | 4 | 5 |
|---|---|---|---|---|---|---|
| Switcher 1 | Single | Single | Single | Single | Single | Single |
| Switcher 2 | Single | Off | Single | Off | Off | Off |
| Switcher 3 | Single | Single | 2 Phase | 2 Phase | Single | |
| Switcher 4 | Single | Single | | | | |

MODE = 0

| CONFIG<2:0> | 0 | 1 | 2 | 3 | 4 | 5 |
|---|---|---|---|---|---|---|
| Switcher 1 | Single | 2 Phase | Single | 2 Phase | Single | Single |
| Switcher 2 | Single | | Single | | Off | Off |
| Switcher 3 | Single | Single | Single | Single | Single | |
| Switcher 4 | Single | Single | Off | Off | | |

FIG. 11

MULTI-PHASE HYSTERETIC BUCK SWITCHING REGULATOR

CROSS-REFERENCE TO RELATED APPLICATIONS

This application claims priority to the following applications, both of which are incorporated by reference herein in their entirety: U.S. Provisional Application No. 62/132,268, entitled "Multi-Phase Hysteretic Buck Switching Regulator," filed on Mar. 12, 2015, and U.S. Provisional Application No. 62/305,372, entitled "Multi-Phase Hysteretic Buck Switching Regulator," filed on Mar. 8, 2016.

BACKGROUND

I. Technical Field

The present subject matter relates to power management units and switching regulators.

II. Background Art

Devices, such as mobile devices including smart phones and tablets, have power management units (PMUs) that control switching regulators providing fast-response voltage outputs for processors of such devices. Switching regulators operate by providing processor-level voltage outputs in phases (e.g., single-, 3-, 6-phase outputs, etc.) from system-level voltage inputs. Single-phase switching regulators with high output current (e.g., >5 A) require large, expensive output inductors.

Current multi-phase switching regulators provide large output currents by dividing load current up amongst multiple output channels. These multi-phase switching regulators consume large quiescent bias current because each channel has a separate, active controller. In current multi-phase switching regulators, unused slave phases remain configured as slave phases during operation.

BRIEF SUMMARY

Methods, systems, circuits, and apparatuses are described for multi-phase hysteretic buck switching regulators, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 10 shows a four-mode regulator configuration table, according to an example embodiment.

FIG. 11 shows a two-mode regulator configuration table, according to an example embodiment.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
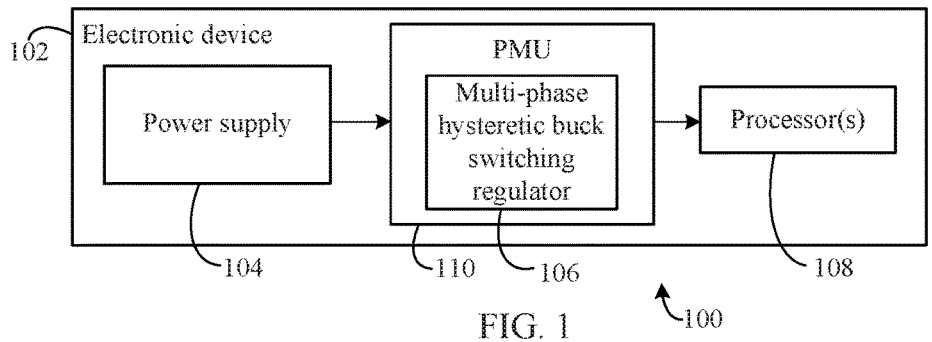
FIG. 1 shows a block diagram of an electronic device with a multi-phase hysteretic buck switching regulator, according to an example embodiment.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Still further, it should be noted that the drawings/figures are not drawn to scale unless otherwise noted herein.

Numerous exemplary embodiments are now described. Any section/subsection headings provided herein are not intended to be limiting. Embodiments are described throughout this document, and any type of embodiment may be included under any section/subsection. Furthermore, it is contemplated that the disclosed embodiments may be combined with each other in any manner. That is, the embodiments described herein are not mutually exclusive of each other and may be practiced and/or implemented alone, or in any combination.

II. Example Embodiments

The example techniques and embodiments described herein may be adapted to various types of systems and devices, for example but without limitation, communication devices (e.g., cellular and smart phones, etc.), communication systems and components (e.g., switches, routers, etc.), computers/computing devices, computing systems, electronic devices, gaming consoles, home electronics and entertainment devices, and/or the like, that use power management units (PMUs) and/or voltage converters such as switching regulators. While the embodiments herein may be described with respect to various circuits/devices and implementations as conceptual and/or illustrative examples for descriptive consistency e.g., converting a device battery voltage to a device processor voltage, other types of circuits/devices and implementations, such as but not limited to, devices and circuits with high-current inductors, switchers with high output currents, etc., are also contemplated for implementing the disclosed techniques. It is contemplated herein that in various embodiments and with respect to the illustrated figures of this disclosure, one or more components described and/or shown may not be included and that additional components may be included.

The example techniques and embodiments described herein provide for power management using multi-phase hysteretic buck switching regulators, e.g., in PMUs, that consume very little bias current. In embodiments, only a single controller may be active even when multiple phases are in use. For example, a master phase circuit may have an active controller while one or more active slave phase circuits do not have an active controller thus reducing current draw on a system power source, such as a battery of an electronic device, when providing an operating voltage to a processor. That is, embodiments utilize a single hysteretic control loop for the master phase while slave phases have minimal circuitry active to save power and increase overall power efficiency (e.g., ~25% of bias current consumed in known solutions). Embodiments also allow for any unused phases to act as independent switchers to increase application flexibility.

In embodiments, a master phase circuit may utilize active control circuitry for the generation of a master control signal, e.g., a master clock signal, by a hysteretic control circuit for controlling output voltages of a buck switching regulator. The master clock signal is provided to a delay generator that outputs time-delayed (i.e., phase-shifted, pulse width modulated) representation signals of the master clock signal for each of one or more active slave phase circuits. The master phase circuit outputs a converted voltage in phase with the master clock signal, and the active slave phase circuits output converted voltages in phase with their respective delayed representations. The delay generator provides an open-loop solution for the generated time-delayed signals to control slave phase circuits without creating duty cycle distortions. For instance, the output portions of the delay generator each use a single comparator for both rising and falling edges of the master clock signal to generate the time-delayed signals. According to embodiments, the delay generator adds a correct amount of delay to the time-delayed signals while preserving the duty-cycle and switching frequency of the master control signal. This is significant for hysteretic controllers because both duty cycle and switching frequency can vary continuously as operating conditions change for the regulator, which is different from switching regulators such as voltage-mode, current-mode, etc., that use a predictable, fixed-frequency system clock. That is, the multi-phase hysteretic buck switching regulators described herein utilize a hysteretic control loop as the oscillator for the control signal, and accordingly, the described multi-phase hysteretic buck switching regulators require the proper amount of timing delay provided by the delay generator as a given slave phase output is capable of changing continuously with the switching frequency.

The described techniques and embodiments provide for low quiescent bias current which increases battery standby time, and the number of active phases can be changed dynamically to maximize efficiency for and the variety of possible applications. Cost savings over large, single-phase switchers is achieved through the use of multiple smaller, cheaper inductors for each of the master and slave phases, and the slave phases are each configured with a single, open-loop comparator to cancel offsets for time delays without duty cycle distortion. Additionally, circuits according to the embodiments and techniques can be reconfigured, scaled, and re-used for multiple products with different output power needs (which also saves development time).

Systems, devices, circuits, and apparatuses contemplated herein, such as systems, devices, circuits, and apparatuses that include multi-phase hysteretic buck switching regulators and their described circuits and components, may be configured in various ways to perform voltage conversions according to the described techniques and embodiments, and to improve power efficiency and signal quality. Techniques and embodiments are provided for implementation in and with circuits, devices, apparatuses, and systems that utilize voltage regulators such as switching regulators, e.g., buck type regulators. For instance, in embodiments, a multi-phase hysteretic buck switching regulator according to the described techniques and embodiments may be implemented in circuits, devices, apparatuses, and systems such as those enumerated herein.

A multi-phase hysteretic buck switching regulator may be implemented in various devices according to embodiments. For instance, FIG. 1 shows a block diagram of an exemplary system 100, according to an embodiment. As shown in FIG. 1, system 100 includes an electronic device 102, which includes a power supply 104, a processor(s) 108, and a PMU 110. PMU 110 includes a multi-phase hysteretic buck switching regulator ("regulator") 106. Regulator 106 converts a voltage from power supply 104 and provides a converted voltage to processor(s) 108.

Electronic device 102 may be a communication device (e.g., cellular or smart phone, etc.), a computer or computing device, a personal electronic device such as a tablet computer, music player, or personal digital assistant, a gaming platform, and/or the like, including other devices described herein, that use voltage converters such as switching regulators and buck switching regulators.

Processor(s) 108 is one or more processors capable of being implemented in an electronic device. For instance, processor(s) 108 may be a single- or multi-core processor, a mobile platform processor, and/or the like. In the context of a communication device or other type of mobile device, during operation, processor(s) 108 may require and obtain an operating voltage converted from power supply 104.

Power supply 104 is any type of battery or other power supply capable of being implemented in an electronic device. For example, power supply 104 may be a rechargeable lithium phone battery where electronic device 102 is a smart phone. Power supply 104 may provide an operating system voltage that is not compatible with one or more components of electronic device 102, e.g., with processor(s) 108. For instance, power supply 104 may provide an operating system voltage of 2.5V-5.0V, while processor(s) 108 may require an operating processor voltage of 0.5V-1.2V.

PMU 110 may include various devices, circuits, and/or subcomponents to control and perform power management operations, as would be understood by one of skill in the relevant art(s) having the benefit of this disclosure. In embodiments, a full instance of PMU 110 may not be included in electronic device 102, but instead only regulator 106 may be included. It is further contemplated that one or more regulators 106 may be included in PMU 110 in the described embodiments.

Regulator 106 is a multi-phase hysteretic buck switching regulator configured to convert the operating system voltage of power supply 104 to the operating processor voltage of processor(s) 108. As described herein, regulator 106 may convert one voltage to another voltage according to one or more phases using a buck switching regulator architecture in accordance with the provided techniques and embodiments. Regulator 106 may include a hysteretic control circuit to provide a control signal for generation of the one or more phases.

Regulator 106 enables improvements over existing single- and multi-phase hysteretic and buck regulator solutions. For example, the time-delayed phases described herein may cancel or reduce ripple in regulator output voltages. Regulator 106 includes a single, active hysteretic control circuit to control each voltage switcher (i.e., a master phase circuit and all associated, active slave phase circuits), thus increasing power efficiency. Additionally, circuit area and cost savings are allowed by the described embodiments by way of using smaller, cheaper output inductors.

The techniques and embodiments described herein provide for improvements in buck and switching regulators, including but not limited to multi-phase regulators.

For instance, methods, systems, circuits, devices and apparatuses are provided for multi-phase hysteretic buck switching regulators. A multi-phase hysteretic buck switching regulator in accordance with an example aspect is described. The multi-phase hysteretic buck switching regulator includes a master phase circuit, a variable delay generator, and at least one slave phase circuit. The master phase circuit is configured to generate a master converted voltage in phase with a received master control signal at an output node. The variable delay generator is configured to receive the master control signal and generate at least one pulse width modulated signal that is a representation of the master control signal. Each of the at least one slave phase circuit is configured to receive a corresponding pulse width modulated signal generated by the variable delay generator, and to generate a corresponding slave converted voltage in phase with its corresponding pulse width modulated representation at the output node.

In embodiments, the multi-phase hysteretic buck switching regulator also includes a hysteretic control circuit configured to generate the master control signal.

A variable delay generator in accordance with another example aspect is described. The variable delay generator includes divider circuitry and output circuitry. The divider circuitry is configured to receive a maximum value of a peak of a ramp voltage, and to divide the maximum value of the peak based on a number of output phases to generate one or more divided values. The output circuitry includes one or more comparators. Each comparator is in an open-loop configuration and is configured to generate a phase-shifted signal that is a representation of a control signal based on the one or more divided values and a comparator ramp voltage for either of a falling edge or a rising edge of the control signal.

In embodiments, the variable delay generator includes ramp generator circuitry configured to receive a representation signal that is representative of a control signal, and generate a first ramp voltage on a first edge transition of the control signal. The variable delay generator also includes peak detector circuitry configured to receive the representation signal, and determine the maximum value of the peak of the first ramp voltage during a cycle of the control signal, according to embodiments. One or more state machines may also be included to monitor the phase-shifted signal that is generated, and to select the first ramp voltage or the second ramp voltage to be the comparator ramp voltage.

A device in accordance with yet another example aspect is also described. The device includes at least one circuit. The circuit includes peak detector circuitry and ramp generator circuitry. The peak detector circuitry includes an output switch configured to provide a peak voltage signal, a first voltage source electrically coupled to a first input of the output switch, and a peak input node electrically coupled to a second input of the output switch. The ramp generator circuitry includes a first current source electrically coupled in series at a shield node to a first capacitor in parallel with a first reset switch, and a second current source electrically coupled in series at a ramp node to parallel circuitry. The parallel circuitry includes a first control switch in series with a second capacitor, a second control switch in series with a third capacitor, and a second reset switch. The first control switch and the second control switch are configured to exclusively alternate connections between the ramp node and the peak input node responsive to an active edge of a control signal. The second current source is configured to generate a ramp voltage via the first capacitor and the second capacitor.

In embodiments, the device includes two or more of the circuit where a first circuit is configured to receive a master clock signal as the control signal, and a second circuit is configured to receive an inverse representation signal that is representative of an inverse of the master clock signal as the control signal.

Various example embodiments are described in the following subsections. In particular, example regulator embodiments are described, including example variable delay generator embodiments and example embodiments for ramp generators and peak detectors. Next, further example embodiments and advantages are described, and subsequently example processing device embodiments are described. Finally, some concluding remarks are provided.

III. Example Regulator Embodiments

As noted above, embodiments for multi-phase hysteretic buck switching regulators may be configured to perform their functions and operations in various ways, and it is contemplated herein that in various embodiments, one or more components described and/or shown may not be included and that additional components may be included.

Figure 2:
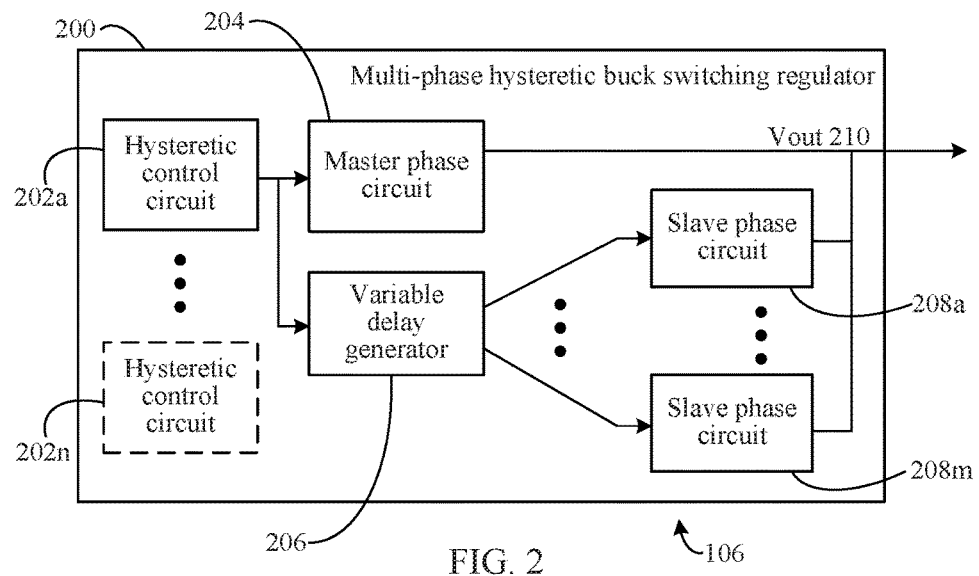
FIG. 2 shows a block diagram of a multi-phase hysteretic buck switching regulator, according to an example embodiment.

Turning now to FIG. 2, a block diagram of multi-phase hysteretic buck switching regulator ("regulator") 106 is shown. Regulator 106 of FIG. 2 includes a multi-phase hysteretic buck switching regulator circuit ("regulator circuit") 200 that is a further example embodiment of regulator 106. Regulator circuit 200 includes a hysteretic control circuit 202a, a master phase circuit 204, a variable delay generator 206 (i.e., a multi-phase, variable delay generator), and one or more slave phase circuits 208a-208m. Hysteretic control circuit 202a is electrically coupled to master phase circuit 204 and to variable delay generator 206. Variable delay generator 206 is electrically coupled to each of slave phase circuits 208a-208m. Master phase circuit 204 and each of slave phase circuits 208a-208m are electrically coupled to a voltage output node Vout 210.

Figure 3:
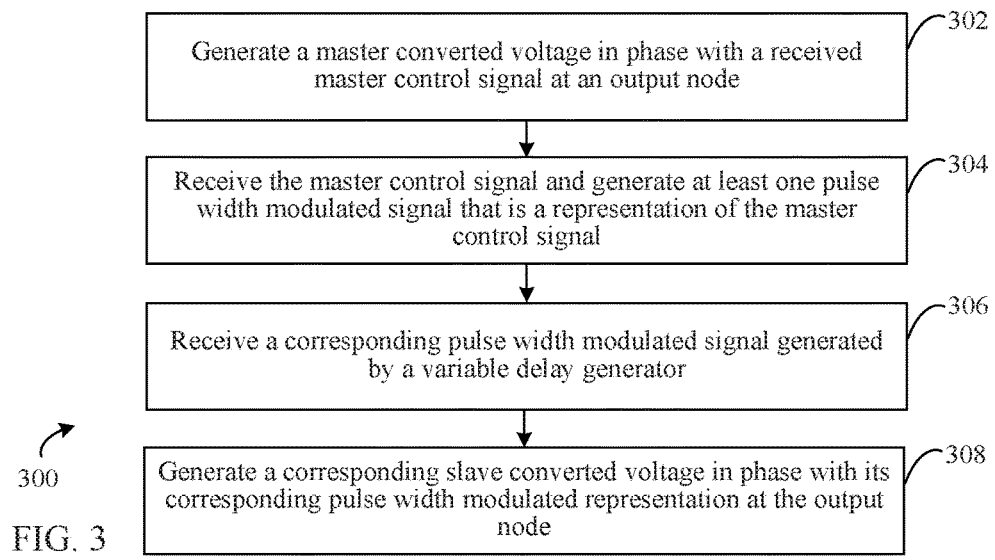
FIG. 3 shows a flowchart for generating in-phase converted voltage signals, according to an example embodiment.

In FIG. 3, a flowchart 300 is shown. Example embodiments described herein may be configured to perform various aspects of voltage conversion and/or regulation according to flowchart 300. For instance, regulator circuit 200 shown in FIG. 2, along with its subcomponents, may perform functions according to flowchart 300 of FIG. 3. Flowchart 300 is described as follows with respect to FIG. 2 for exemplary illustration.

A master converted voltage is generated in phase with a received master control signal at an output node (302). For example, master phase circuit 204 is configured to generate a master converted voltage in phase with a received master control signal at an output node. In embodiments, the master control signal may be a master clock signal and may be received from hysteretic control circuit 202a. The master converted voltage may be provided on node Vout 210.

A master control signal is received and at least one pulse width modulated signal that is a representation of the master control signal is generated (304). For instance, variable delay generator 206 is configured to receive the master control signal, according to embodiments. The master control signal may be a master clock signal and may be received from hysteretic control circuit 202a. Variable delay generator 206 is also configured to generate at least one pulse width modulated signal that is a representation signal of the master control signal. The number of pulse width modulated signals may be based on the number of active phases (i.e., the number of active slave phase circuits 208a-208m) of regulator circuit 200. Each pulse width modulated signal is phase shifted with respect to the master control signal. For example, in a four-phase configuration having master phase (i.e., master phase circuit 204) and three active slave phases [1, 2, 3] (i.e., slave phase circuits 208a-208m), the phase shifts are ¼, ½, and ¾ of the master control signal period, respectively. That is, for y number of active phases, the pulse width modulated signals for each progressively numbered active slave phase circuit are phase shifted according to:

$$\frac{\text{Slave Phase Number}}{y}. \quad \text{(Equation 1)}$$

A corresponding pulse width modulated signal generated by the variable delay generator is received (306). For example, in embodiments, each active slave phase circuit 208a-208m receives a corresponding pulse width modulated signal from variable delay generator 206. The phase shift for each corresponding pulse width modulated signal is determined as described above in Equation 1 in (304).

A corresponding slave converted voltage in phase with its corresponding pulse width modulated representation is generated at the output node. For instance, each active slave phase circuit 208a-208m generates a slave converted voltage in phase with its pulse width modulated representation, according to embodiments. Each active slave phase circuit 208a-208m provides its slave converted voltage on node Vout 210, as described above with respect to master phase circuit 204.

Hysteretic control circuit 202a is configured to provide the master control signal to master phase circuit 204 and to variable delay generator 206. Hysteretic control circuit 202a may include a hysteretic component such as a comparator to generate the master control signal. As shown in FIG. 2, regulator circuit 200 may include one or more hysteretic control circuits 202a-202n, and each such circuit may be similarly configured and may similarly operate as described hysteretic control circuit 202a. Only hysteretic control circuit 202a is described in detail for brevity and illustrative clarity. As shown, hysteretic control circuit 202a is directly associated with, i.e., provides its output to, master phase circuit 202a of the illustrated phase circuits.

According to embodiments, and as described in further detail below, each slave phase circuit 208a-208m may be configured/activated into a master phase mode to operate as a master phase circuit, and in such configurations, a given slave phase circuit may also be associated with hysteretic control circuit 202a or directly associated with any of hysteretic control circuits 202a-202n. Each slave phase circuit 208a-208m may respectively include a passive feedback circuit 418b-418n. In a slave phase mode for a slave phase circuit 208a-208m, corresponding passive feedback circuit 418b-418n is inactive, but when a slave phase circuit 208a-208m is activated and configured as a master phase circuit, the corresponding passive feedback circuit 418b-418n may also become active to be configured as and perform functions similar to or the same as passive feedback circuit 418a with respect to master phase circuit 204, as described herein.

Figure 4:
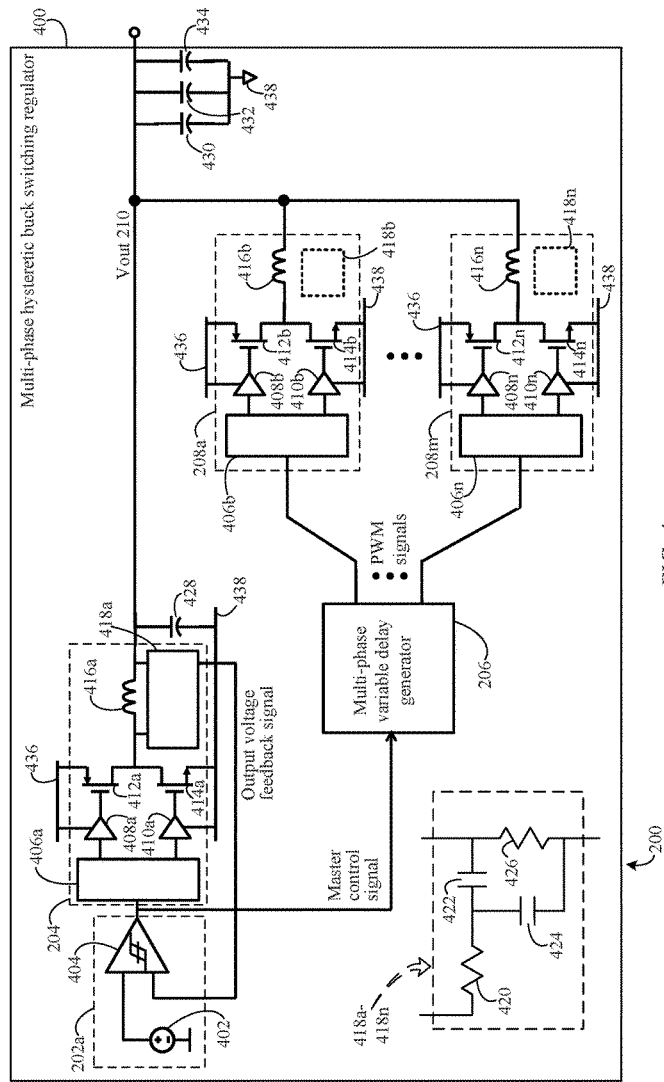
FIG. 4 shows a multi-phase hysteretic buck switching regulator circuit, according to an example embodiment.

FIG. 4 shows multi-phase hysteretic buck switching regulator circuit ("regulator circuit") 200, according to an embodiment. Regulator circuit 200 includes a multi-phase hysteretic buck switching regulator circuit ("regulator circuit") 400 that is a further embodiment of regulator circuit 200 of FIG. 2. As shown in FIG. 4, regulator circuit 400 includes hysteretic control circuit 202a, master phase circuit 204, variable delay generator 206 (i.e., a multi-phase delay generator), and one or more slave phase circuits 208a-208m. Regulator circuit 400 also includes a passive feedback circuit 418a (i.e., a passive feedback network). Hysteretic control circuit 202a is electrically coupled to master phase circuit 204 and to variable delay generator 206. Passive feedback circuit 418a is electrically coupled between the output of master phase circuit 204 and an input of hysteretic control circuit 202a. Variable delay generator 206 is coupled to each of slave phase circuits 208a-208m. Master phase circuit 204 and each of slave phase circuits 208a-208m are electrically coupled to a voltage output node Vout 210. A system voltage VDD 436 (e.g., from a power source or battery such as power source 102 of FIG. 1) and a system ground VSS 438 are also illustrated.

Hysteretic control circuit 202a includes a voltage digital to analog converter (DAC) 402 and a hysteretic comparator 404. Hysteretic control circuit 202a is configured to provide a master control signal, e.g., a master clock signal or other oscillating signal, to master phase circuit 204 and to variable delay generator 206. For instance, hysteretic comparator 404 is configured to receive a voltage feedback signal as a first input from passive feedback network 418a, and DAC 402 is configured to generate a reference voltage as a second input to hysteric comparator 404. Based on these inputs, hysteretic comparator 404 is configured to generate the master control signal provided to master phase circuit 204 and to variable delay generator 206. In embodiments, hysteretic control circuit 202a may also be configured to provide the master control signal at one or more duty cycles, such as but without limitation, 25%, 33%, 50%, etc., based on the configuration of regulator circuit 400. Further, as described herein, the switching frequency of the master control signal may vary according to regulator operation and/or configuration, and such variance is accurately tracked and reproduced by variable delay generator 206 described below.

Figure 5:
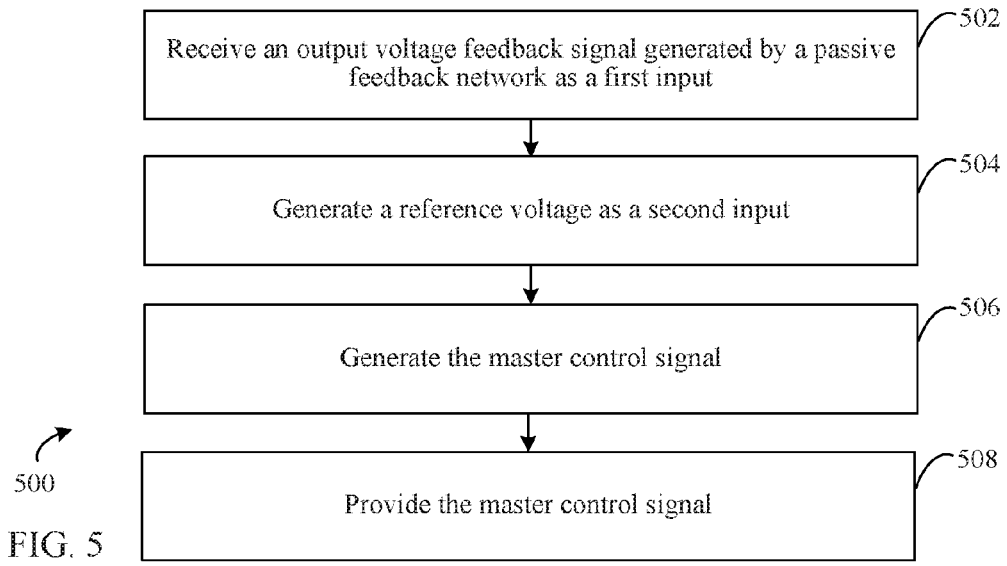
FIG. 5 shows a flowchart for generating and providing a master control signal, according to an example embodiment.

Turning now to FIG. 5, a flowchart 500 is shown. Hysteretic control circuits 202a-202n, as described herein, may operate or perform various functions in accordance with flowchart 500. For instance, hysteretic control circuit 202a may generate and provide a master control signal according to flowchart 500, which is described as follows.

An output voltage feedback signal generated by a passive feedback network is received as a first input (502). For instance, passive feedback circuit 418a is configured to generate and provide an output voltage feedback signal based on the output of master phase circuit 204 to hysteretic control circuit 202a. Specifically, in embodiments, hysteretic comparator 404 is configured to receive the output voltage feedback signal as a first input.

A reference voltage is generated as a second input (504). For example, DAC 402 is configured to generate and provide a reference voltage to hysteretic comparator 404 as a second input. The reference voltage value may be configured according to the requirements of regulator circuit 400, e.g., based on system voltage value and voltage conversion requirements for device components such as processor(s) 108 of FIG. 1.

A master control signal is generated (506). For instance, hysteretic comparator 404 is configured to generate a master control signal based on the inputs described in (502) and (504). In embodiments, the master control signal is a master clock signal as described herein.

The master control signal is provided (508). The master control signal generated in (506) is provided by hysteretic comparator 404 of hysteretic control circuit 202a to master phase circuit 204 and to variable delay generator 206 as shown in FIG. 4.

In some embodiments, such as those where a slave phase circuit of slave phase circuits 208a-208m is activated and configured as a master phase circuit, any of hysteretic control circuits 202a-202n may be configured to provide a respective generated master control signal to the activated slave phase circuit operating as a master phase circuit similarly as described herein.

Referring again to FIG. 4, variable delay generator 206 is configured to receive the master control signal from hysteretic control circuit 202a and to generate at least one pulse width modulated (PWM) signal that is a representation of the master control signal. Generated pulse width modulated signals are provided to active slave phase circuits 208a-208m.

As illustrated, master phase circuit 204 and each of slave phase circuits 208a-208m include a non-overlap generator, a first driver-transistor pair, a second driver-transistor pair, and an output inductor. Each of the non-overlap generators, first driver-transistor pairs, second driver-transistor pairs, and output inductors described herein may be similarly configured and/or include similar or the same subcomponents. First and second driver-transistor pairs in master phase circuit 204 and each of slave phase circuits 208a-208m may be referred to as driver circuits. A non-overlap generator is configured to split the master control signal for master phase circuits, and to split pulse width modulated signals for each of the slave phase circuits. In embodiments, splitting signals by non-overlap generators generates a first phase control signal and a second phase control signal from the control signal. As illustrated, a first phase control signal is provided to the driver of the first driver-transistor pair, and a second phase control signal is provided to the driver of the second driver-transistor pair.

For example, master phase circuit 204 includes a non-overlap generator 406a. Master phase circuit 204 includes a first driver-transistor pair comprised of a driver 408a and a transistor 412a each electrically coupled to VDD 436, as shown. Master phase circuit 204 also includes a second driver-transistor pair comprised of a driver 410a and a transistor 414a each electrically coupled to VSS 438, as shown. The common node of transistor 412a and transistor 414a provides the output of master phase circuit 204 via an inductor 416a, i.e., an output inductor, which in turn provides a master converted voltage in phase with the received master control signal at node Vout 210.

Slave phase circuits 208a-208m each include a non-overlap generators 406b-406n, respectively. Slave phase circuits 208a-208m each respectively include a first driver-transistor pair comprised of a driver 408b and a transistor 412b (e.g., for slave phase circuit 208a) through a driver 408n and a transistor 412n (e.g., for slave phase circuit 208m) that are each electrically coupled to VDD 436, as shown. Slave phase circuits 208a-208m also each respectively include a second driver-transistor pair comprised of a driver 410b and a transistor 414b (e.g., for slave phase circuit 208a) through a driver 410n and a transistor 414n (e.g., for slave phase circuit 208m) that are each electrically coupled to VSS 438, as shown. The common nodes of transistors 412b/414b through transistors 412n/414n provide the respective outputs of slave phase circuits 208a-208n via inductors 416b-416n, each of which in turn provide a slave converted voltage in phase with their received pulse width modulated signals at node Vout 210.

Figure 6:
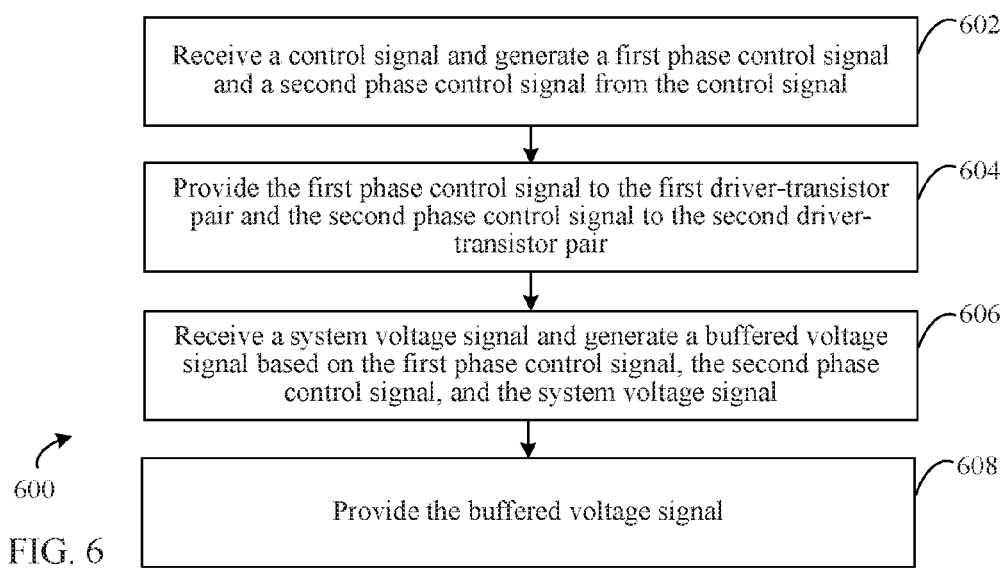
FIG. 6 shows a flowchart for generating and providing a master buffered voltage signal, according to an example embodiment.

In FIG. 6, a flowchart 600 is shown. Master phase circuit 204 and slave phase circuits 208a-208m, including any of their subcomponents as described herein, may operate or perform various functions in accordance with flowchart 600. For instance, master phase circuit 204 may generate and provide a master buffered voltage signal according to flowchart 600, described as follows.

A control signal is received and a first phase control signal and a second phase control signal are generated from the control signal (602). For example, a non-overlap generator (e.g., one or more of non-overlap generators 406a-406n)

may receive a control signal. Non-overlap generator 406*a* receives a control signal as the master control signal from hysteretic control circuit 202*a*. Non-overlap generators 406*b*-406*n* receive control signals as pulse width modulated signals from variable delay generator 206. Non-overlap generators 406*a*-406*n* are configured to generate respective first and second phase control signals based on their received control signals.

The first phase control signal is provided to the first driver-transistor pair and the second phase control signal is provided to the second driver-transistor pair (604). For instance, a non-overlap generator (e.g., one or more of non-overlap generators 406*a*-406*n*) may provide its generated first and second phase control signals, as in (602), to the drivers of electrically coupled first and second driver-transistor pairs. Non-overlap generator 406*a* provides a first phase control signal to driver 408*a* and a second phase control signal to driver 410*a*. Non-overlap generators 406*b*-406*n* provide a first phase control signal to driver 408*b*-408*n* and a second phase control signal to drivers 410*b*-410*n*.

A system voltage signal is received and a buffered voltage signal is generated based on the first phase control signal, the second phase control signal, and the system voltage signal (606). For example, the first driver-transistor pairs of master phase circuit 204 and slave phase circuits 208*a*-208*m* are electrically coupled to VDD 436, e.g., a battery or other system power source, which provides a system voltage that is received. From VDD 436 and the provided first and second phase control signals, the first driver-transistor pairs of master phase circuit 204 and of slave phase circuits 208*a*-208*m* are configured to generate respective buffered voltage signals.

The buffered voltage signal is provided (608). For instance, a buffered voltage signal is provided from the buffer circuits of master phase circuit 204 and of slave phase circuits 208*a*-208*m*. The buffered voltage signals are provided via inductor 416*a* of master phase circuit 204 and via inductors 416*b*-416*n* of slave phase circuits 208*a*-208*n*. The buffered voltage signal of master phase circuit 204 is also provided to passive feedback circuit 418*a*.

Referring again to FIG. 4, regulator circuit 400 also includes one or more capacitors in embodiments. As shown, a capacitor 428, a capacitor 430, a capacitor 432, and a capacitor 434 are included, and may be of any known capacitor type or configuration and have any capacitive values according to design and operational considerations. Capacitor 428, capacitor 430, capacitor 432, and capacitor 434 may be electrically coupled between node Vout 210 and VSS 438 for outputs of master phase circuit 204 and slave phase circuits 208*a*-208*m* respectively. The illustrated capacitors along with inductors 416*a*-416*n* form LC filters for each phase circuit output (i.e., master phase circuit 204 and slave phase circuits 208*a*-208*m*). In embodiments, more or fewer capacitors may be included, including more or fewer capacitors having an equivalent total capacitance.

As described above, master phase circuit 204 is configured to receive the master control signal, e.g., as provided in (506) of flowchart 500, and to generate and provide a master converted voltage in phase with the received master control signal as provided in (508) at node Vout 210. Master phase circuit 204 is also configured to provide outputs to passive feedback circuit 418. For example, master phase circuit 204 is configured to provide the buffered voltage signal to passive feedback circuit 418*a* from each side of inductor 416*a* as shown in FIG. 4, i.e., from the common node of first transistor 412*a* and first transistor 414*a*, and from node Vout 210.

Passive feedback circuit 418*a* may be an RC circuit or network as shown in FIG. 4. For example, a resistor 420 may be coupled to and receive a buffered voltage signal from the common node of first transistor 412*a* and first transistor 414*a* at a first terminal. Resistor 420 may be electrically coupled at a second terminal to a first terminal of capacitor 422 and of capacitor 424. Capacitor 422, at a second terminal, and resistor 426, at a first terminal, may each be electrically coupled to node Vout 210. Capacitor 424 and resistor 426 may be coupled to the second input of hysteretic comparator 404 at their second terminals to provide a voltage feedback signal to hysteretic comparator 404, as described herein.

Figure 7:
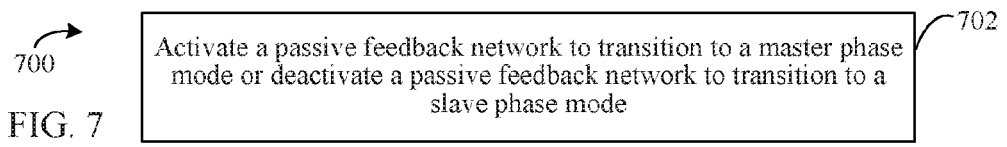
FIG. 7 shows a flowchart for activating a passive feedback network, according to an example embodiment.

FIG. 7 shows a flowchart 700, according to an example embodiment. Slave phase circuits 208*a*-208*m* of FIGS. 2 and 4, and subcomponents thereof, may be configured to operate according to flowchart 700. Flowchart 700 is described as follows.

A passive feedback network is activated to transition to a master phase mode or a passive feedback network is deactivated to transition to a slave phase mode (702). For instance, passive feedback networks 418*b*-418*n* may be activated in embodiments to configure slave phase circuits 208*a*-208*m* in master phase modes to operate as master phase circuits, similar to or the same as master phase circuit 204. When in master phase modes, passive feedback networks 418*b*-418*n* may be deactivated in embodiments to configure slave phase circuits 208*a*-208*m* in slave phase modes. The activation and deactivation may be determined and performed by a dynamic activation/deactivation control circuit.

Figure 8:
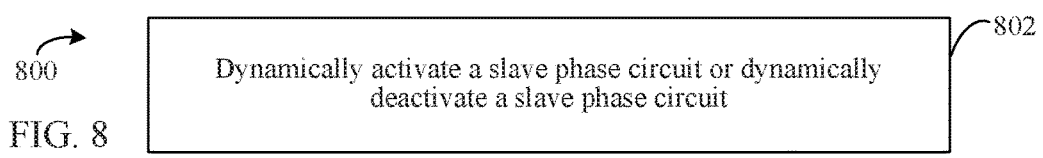
FIG. 8 shows a flowchart for dynamically activating slave phase circuits, according to an example embodiment.

In FIG. 8 a flowchart 800 is shown. Slave phase circuits 208*a*-208*m*, and subcomponents thereof, may be configured to operate according to flowchart 800. Flowchart 800 is described as follows.

A slave phase circuit is dynamically activated or a slave phase circuit is dynamically deactivated (802). For instance, slave phase circuits 208*a*-208*m* may be dynamically activated in embodiments to enable slave phase circuits 208*a*-208*m* to operate and to provide an additional active phase (i.e., an additional output) for a regulator described herein, such as regulator 106, regulator circuit 200, and/or regulator circuit 400. Slave phase circuits 208*a*-208*m* may also be dynamically deactivated in embodiments to disable the operation of slave phase circuits 208*a*-208*m* and to reduce the number of active phases (i.e., fewer outputs) for a regulator described herein, such as regulator 106, regulator circuit 200, and/or regulator circuit 400.

The activation and deactivation, as well as master phase configurations, of slave phase circuits 208*a*-208*m* described above allows for optional flexibility for different applications and for power savings during operation. The dynamic activation and deactivation may be determined and performed by a dynamic activation/deactivation control circuit.

Figure 9:
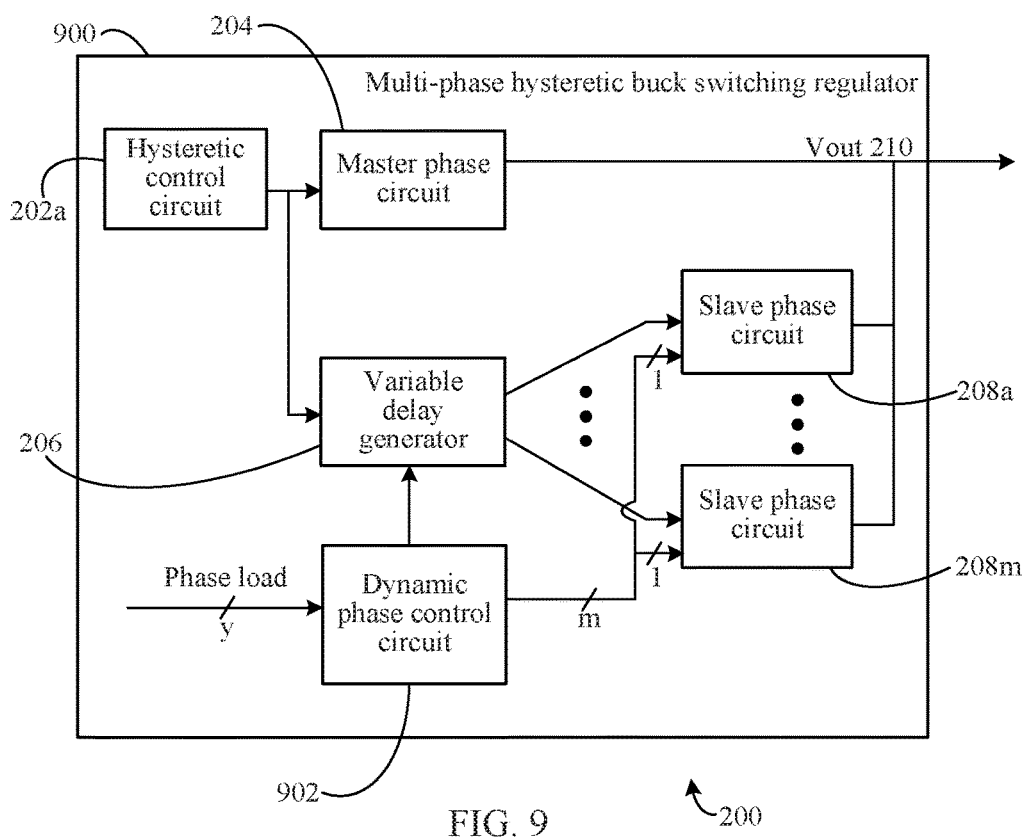
FIG. 9 shows a block diagram of a multi-phase hysteretic buck switching regulator circuit with a dynamic phase control circuit, according to an example embodiment.

In FIG. 9, a block diagram of multi-phase hysteretic buck switching regulator circuit ("regulator circuit") 200 is shown. Regulator circuit 200 of FIG. 9 includes a multi-phase hysteretic buck switching regulator circuit ("regulator circuit") 900. Regulator circuit 900 may be a further embodiment of regulator circuit 200 of FIG. 2, or of regulator 106 of FIG. 1 and/or regulator circuit 400 of FIG. 4. The illustrated portions of regulator circuit 200 from FIG. 2 are described above and their description is not repeated here for the sake of brevity.

Regulator circuit 900 includes a dynamic phase control circuit (DPC) 902. DPC 902 is electrically coupled to variable delay generator 206 and to slave phase circuits 208a-208m. DPC 902 is configured to receive signals indicative of the loads of active phases in regulator circuit 900 and to determine if dynamic reconfigurations of phases for regulator circuit 900 are needed and/or are to be made. For instance, DPC 902 is configured to dynamically activate and deactivate each of slave phase circuits 208a-208m. According to embodiments, as the load supplied by regulator circuit 900 increases, additional slave phases may be required and may be dynamically added by activating one or more of slave phase circuits 208a-208m. In contrast, as the load supplied by regulator circuit 900 decreases, fewer slave phases may be required and may be dynamically removed from operation by deactivating one or more of slave phase circuits 208a-208m.

DPC 902 is also configured to activate and deactivate a master phase mode for each of slave phase circuits 208a-208m in which slave phase circuits 208a-208m may operate as master phase circuits such as master phase circuit 204 described herein. For example, DPC 902 may provide an activation signal(s) to one or more of slave phase circuits 208a-208m to activate or enable associated passive feedback circuits 218b-218n, and may provide a configuration signal(s) to variable delay generator 206 that enables a master control signal to be provided to the slave phase circuit being configure to the master phase mode while prohibiting the slave phase circuit from receiving its pulse width modulated signal from variable delay generator 206. DPC 902 may provide a deactivation signal(s) to one or more of slave phase circuits 208a-208m to deactivate the enabled master phase mode of operation and return to a slave phase mode.

In FIG. 10, an exemplary configuration table 1000 is shown. The embodiments disclosed herein may be configured to operate according to configuration table 1000. For example, a multi-phase hysteretic buck switching regulator described herein may comprise a plurality of switchers which may each be designated as master phase circuits and/or slave phase circuits that operate according to configuration table 1000. The number of active phases may be changed dynamically during operation according to the "MODE" (exemplarily shown as a 2-bit implementation providing for four modes). The configuration ("CONFIG") bits indicate a maximum number of phases that may be active during operation and various phase combinations, which may remain static during operation (exemplarily shown as a 3-bit implementation with six configurations illustrated).

In FIG. 11, a configuration table 1100 is shown. The embodiments herein may be configured to operate according to the configurations of configuration table 1100. For example, a multi-phase hysteretic buck switching regulator described herein may comprise a plurality of switchers which may each be designated as master phase circuits and/or slave phase circuits according to configuration table 1100. The number of active phases may be changed dynamically during operation according to the "MODE" (exemplarily shown as a 1-bit implementation). The MODE bit selects one- or two-phase operation for switcher 3 and switcher 4 in a two-phase configuration. The configuration ("CONFIG") bits indicate a maximum number of phases that may be active during operation and various phase combinations, which may remain static during operation.

Referring back again to FIG. 4, variable delay generator 206 is configured to provide multi-phase control signals (i.e., pulse width modulated signals) to slave phase circuits (e.g., slave phase circuits 208a-208m). Variable delay generator 206 may be configured to generate any number of pulse width modulated signals according to embodiments.

By way of example and not limitation, variable delay generator 206 may generate three pulse width modulated signals for a four-phase implementation.

Figure 12:
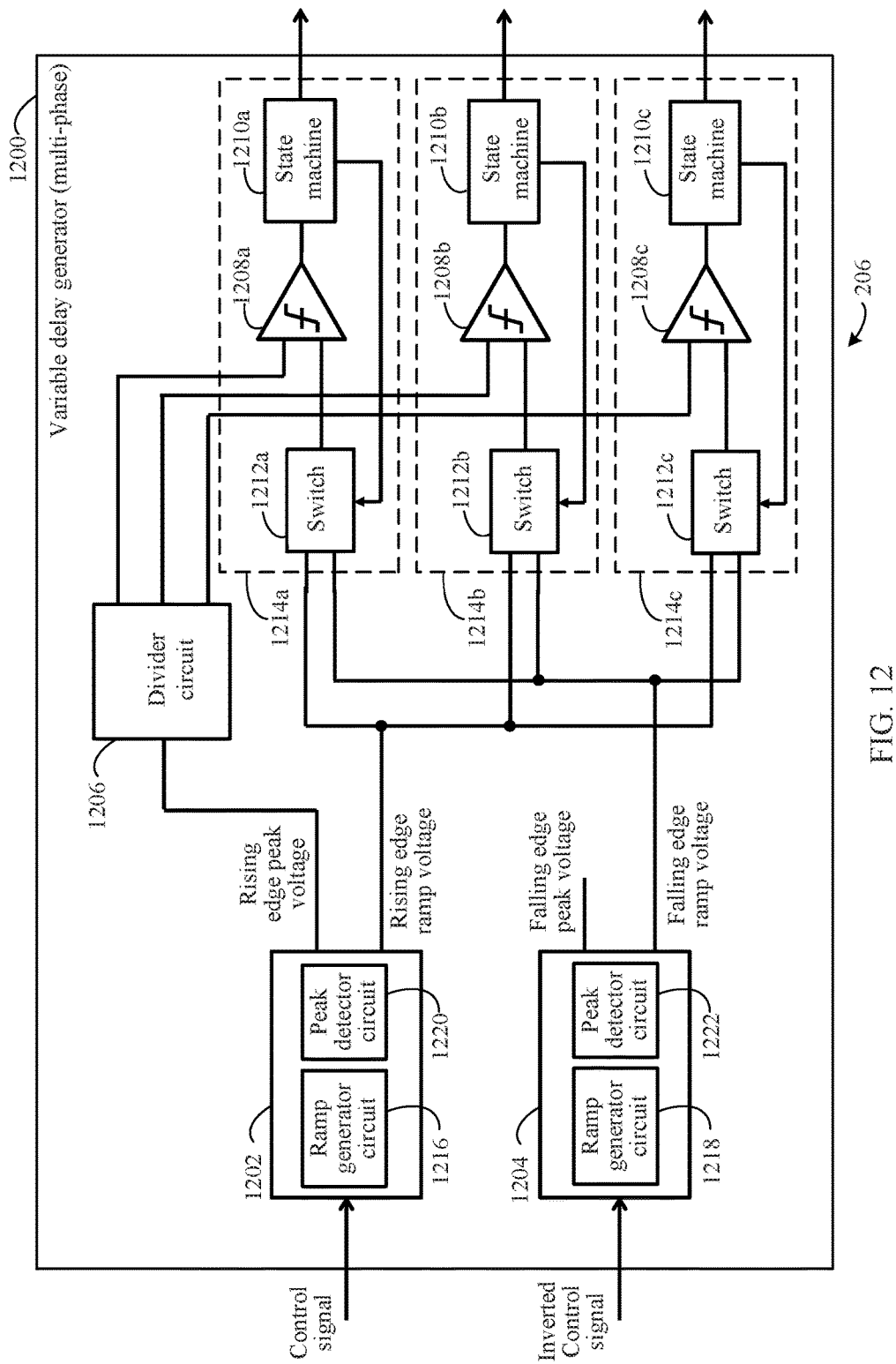
FIG. 12 shows a circuit diagram of a multi-phase variable delay generator, according to an example embodiment.

Turning now to FIG. 12, a circuit diagram of a variable delay generator circuit 206 is shown. Variable delay generator 206 includes a variable delay generator circuit 1200. Variable delay generator circuit 1200 is a further embodiment of variable delay generator 206 of FIGS. 2 and 4 described above. Variable delay generator circuit 1200 is a multi-phase delay generator. The illustrated embodiment of variable delay generator circuit 1200 is described as follows.

Variable delay generator circuit 1200 includes a first edge-triggered circuit 1202, a second edge-triggered circuit 1204, a divider circuit 1206, open-loop comparators 1208a-1208c, state machines 1210a-1210c, and switches 1212a-1212c. Open-loop comparator 1208a, state machine 1210a, and switch 1212a comprise first output circuitry 1214a, open-loop comparator 1208b, state machine 1210b, and switch 1212b comprise second output circuitry 1214b, and open-loop comparator 1208c, state machine 1210c, and switch 1212c comprise third output circuitry 1214c. First edge-triggered circuit 1202 and second edge-triggered circuit 1204 receive control signal inputs and provide edge-triggered ramp voltages to each of switches 1212a-1212c via an electrical connection. First edge-triggered circuit 1202 is also electrically coupled to divider circuit 1206 to provide a voltage peak signal. Divider circuit 1206 is electrically coupled to each of open-loop comparators 1208a-1208c via an electrical connection, and switches 1212a-1212c are electrically coupled to open-loop comparators 1208a-1208c, respectively. Open-loop comparators 1208a-1208c are electrically coupled to state machines 1210a-1210c, respectively, and state machines 1210a-1210c are electrically coupled to switches 1212a-1212c.

While three instances of open-loop comparators 1208a-1208c, state machines 1210a-1210c, and switches 1212a-1212c are illustrated by way of example, it is contemplated herein that more or fewer of each of these components may be included in embodiments.

Figure 13:
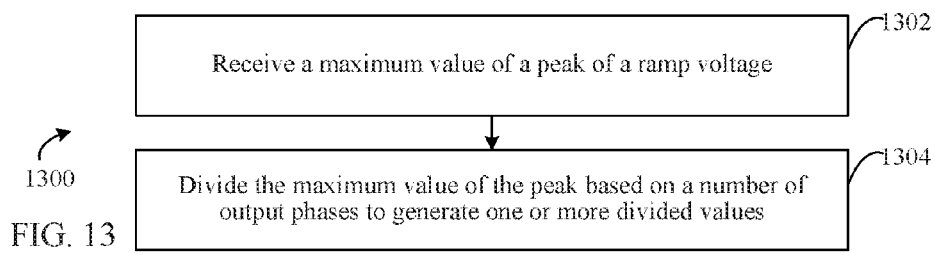
FIG. 13 shows a flowchart for generating divided signals as trip-points, according to an example embodiment.

Divider circuit 1206 is configured to divide and filter inputs to generate and provide trip-point voltages. Referring now to FIG. 13, a flowchart 1300 is shown. Divider circuit 1206 and any of its subcomponents may be configured to operate according to flowchart 1300. Flowchart 1300 is described as follows.

A maximum value of a peak of a ramp voltage is received (1302). For instance, divider circuit 1206 is configured to receive a maximum value of a peak of a ramp voltage from first edge-triggered circuit 1206. In embodiments, the ramp voltage is a ramp that is triggered from the rising edge of a control signal received by variable delay generator circuit 1200 (e.g., at first edge-triggered circuit 1206), such as the master control signal provided by hysteretic control circuit 202a.

The maximum value of the peak is divided based on a number of output phases to generate one or more divided values (1304). According to embodiments, divider circuit 1206 is configured to divide the maximum value of the peak based on a number of output phases to generate one or more divided values as trip-point voltages. The trip-point voltages are provided as buffered outputs by divider circuit 1206 to be input to each of open-loop comparators 1208a-1208c. For instance, in a configuration of a regulator with four active phases (i.e., three active slave phases), divider circuit 1206 is configured to provide three trip-point voltage outputs at ¼, ½, and ¾ of the received rising edge peak voltage signal for corresponding time-delayed pulse width modulated signals at phase shifts equal to ¼, ½, and ¾ of the master control signal period.

Referring back to FIG. 12, divider circuit 1206 may include one or more RC filter circuits for filtering its input signals and/or output signals. For example, divider circuit 1206 may receive a rising edge peak voltage signal from first edge-triggered circuit 1202 and pass the received signal through an RC filter and then divide the signal into a plurality of peak voltage signals, e.g., three peak voltage signals. Divider circuit 1206 is configured to buffer and output each of the plurality of peak voltage signals according to Equation 1, as described above.

Figure 14:
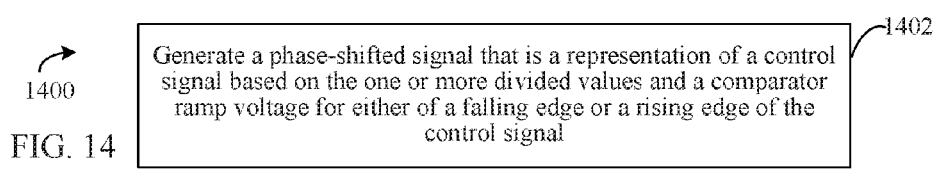
FIG. 14 shows a flowchart for generating a phase-shifted signal that is a representation of a control signal, according to an example embodiment.

Output circuitry 1214a-1214c are configured to select between rising and falling edge ramp voltage signals and to generate and provide phase-delayed, pulse width modulated signals. Referring now to FIG. 14, a flowchart 1400 is shown. Each of output circuitry 1214a-1214c and any of subcomponents thereof may be configured to operate according to flowchart 1400. Flowchart 1400 is described as follows.

A phase-shifted signal that is a representation of a control signal is generated based on the one or more divided values and a comparator ramp voltage for either of a falling edge or a rising edge of the control signal (1402). For instance, each of output circuitry 1214a-1214c are configured to generate a phase-shifted signal, i.e., a pulse width modulated signal, that is a representation of a control signal, such as the master control signal from hysteretic control circuit 202a, based on the one or more divided values as in (1304) and a comparator ramp voltage for either of a falling edge or a rising edge of the control signal. In embodiments, a comparator ramp voltage is an input signal, i.e., a ramp voltage or ramp voltage signal, to one of open-loop comparators 1208a-1208c that is generated by first edge-triggered circuit 1202 or second edge-triggered circuit 1204, as described herein.

Referring back to FIG. 12, switches 1212a-1212c may be any type of known switch or selector, e.g., single-pole, double-throw (SPDT) switches, multiplexors (muxes) such as analog muxes, or any other type of electrical component or circuitry from which one of two or more inputs may be selected based on an activation signal or selection signal. Switches 1212a-1212c are configured to receive respective activation signals from state machines 1210a-1210c to switch between inputs. As shown, a rising edge triggered ramp voltage signal from first edge-triggered circuit 1202 is provided as a first input to switches 1212a-1212c, and a falling edge triggered ramp voltage signal from second edge-triggered circuit 1204 is provided as a second input to switches 1212a-1212c. Accordingly, switches 1212a-1212c are configured to select between the first and second inputs based on the received activation signals.

The inputs selected by switches 1212a-1212c as described above are provided to open-loop comparators 1208a-1208c respectively. That is, switches 1212a-1212c are configured to receive a rising edge triggered ramp voltage signal from first edge-triggered circuit 1202 via switches 1212a-1212c, and a falling edge triggered ramp voltage signal from second edge-triggered circuit 1204 via second input to switches 1212a-1212c. Open-loop comparators 1208a-1208c may be any type of known comparator, including but without limitation, hysteretic comparators. In the illustrated embodiment, open-loop comparators 1208a-1208c are in an open-loop configuration. It should be noted that in embodiments, a single comparator is provided with both the rising and falling edge triggered ramp voltage signals. That is, the rising edge triggered ramp voltage signal from first edge-triggered circuit 1202 and the falling edge triggered ramp voltage signal from second edge-triggered circuit 1204 are each provided to a single comparator (i.e., each of open-loop comparators 1208a-1208c). Accordingly, the pulse width modulated signals generated by and provided from output circuits 1214a-1214c have reduced, relative duty-cycle error from offset and delay variations which reduces or eliminates current variation between output phases and preserves the duty cycle. Additionally, the open-loop configuration of open-loop comparators 1208a-1208c provides for accurate tracking and reproduction of the switching frequency of the master control signal that may vary during operation. Furthermore, while not shown for illustrative clarity, each of open-loop comparators 1208a-1208c may provide their respective output signals to buffering circuitry, such as signal buffers, inverting buffers, latches, flip-flops, and/or the like, to buffer the output signals (i.e., the pulse width modulated signals) before provision thereof to slave phase circuits 208a-208m.

State machines 1210a-1210c are configured to determine which ramp voltage signal is to be monitored. State machines 1210a-1210c may include any type of logic and/or electrical circuitry for monitoring ramp voltage signals as described herein and providing activation signals to switches. State machines 1210a-1210c may be identically or approximately identically configured, and for brevity, only state machine 1210a is described in detail. For example, state machine 1210a may include logic and/or electrical circuitry that receives the master control signal from hysteretic control circuit 202a and the pulse width modulated signal from output circuit 1214a. When the pulse width modulated signal has a 'low' value and a rising edge of the pulse width modulated signal is detected, an activation signal is provided by state machine 1210a to select a rising edge triggered ramp voltage signal from first edge-triggered circuit 1202 at switch 1212a. When the pulse width modulated signal has a 'high' value and a falling edge of the pulse width modulated signal is detected, an activation signal is provided by state machine 1210a to select a falling edge triggered ramp voltage signal from second edge-triggered circuit 1204 at switch 1212a.

First edge-triggered circuit 1202 and second edge-triggered circuit 1204 are configured to be electrically coupled to a controller, e.g., hysteretic control circuit 202a, to receive a control signal, e.g., a master control signal. As shown in FIG. 12, first edge-triggered circuit 1202 receives the master control signal, and second edge-triggered circuit 1204 receives an inverted master control signal. However, it is contemplated herein that second edge-triggered circuit 1204 may also receive the master control signal (i.e., non-inverted) and invert the master control signal, or that second edge-triggered circuit 1204 may receive the master control signal (i.e., non-inverted) and perform its triggering on an appropriate edge thereof, e.g., the falling edge of the master control signal.

As shown, first edge-triggered circuit 1202 includes a ramp generator circuit 1216 and a peak detector circuit 1220, and second edge-triggered circuit 1204 includes a ramp generator circuit 1218 and a peak detector circuit 1222. In the illustrated embodiment, ramp generator circuit 1216 is configured to generate a ramp voltage signal at the rising edge of the received control signal, i.e., the master control signal from hysteretic control circuit 202a, and ramp generator circuit 1218 is configured to generate a ramp voltage signal at the rising edge of the received, inverted control signal. That is, each of ramp generator circuit 1216 and ramp generator circuit 1218 may be configured to generate ramp voltage signals according to a rising edge of a received control signal, and thus, in embodiments, ramp generator circuit 1216 and ramp generator circuit 1218 may comprise the same or similar subcomponents and/or circuitry. For the sake of brevity, ramp generator circuit 1216 will be referred to in the following description, and the described embodiments may be similarly applicable to ramp generator circuit 1218.

Figure 15A:
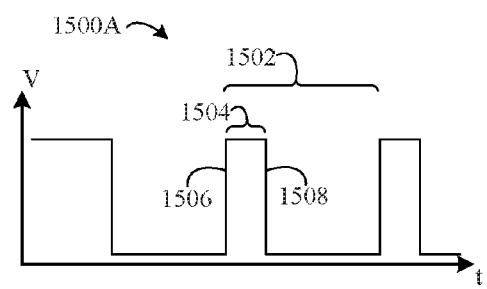
FIG. 15A shows signal waveform for a control signal, according to an example embodiment.
Figure 15B:
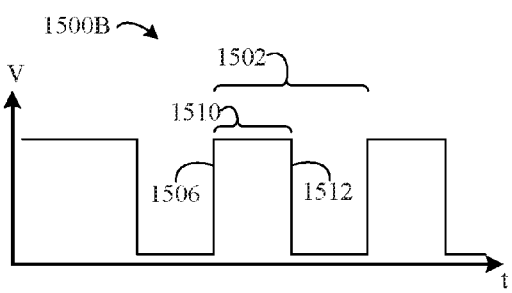
FIG. 15B shows signal waveform for a control signal, according to an example embodiment.
Figure 15C:
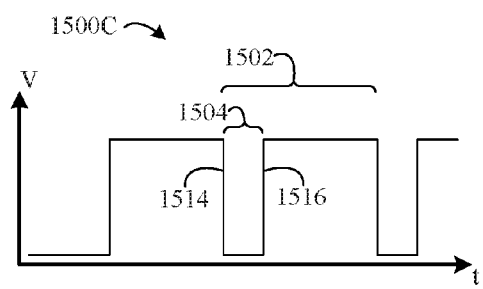
FIG. 15C shows signal waveform for an inverted representation signal of the control signal in FIG. 15A, according to an example embodiment.

Turning now to FIGS. 15A, 15B, and 15C, example control signals 1500A 1500B, and 1500C are respectively shown. The described control signals may have amplitudes (V) according to design requirements for a regulator as described herein, such as regulator 106. Control signal 1500A of FIG. 15A has a period 1502, a duty cycle 1504, a rising edge 1506, and a falling edge 1508. In embodiments, control signal 1500A may correspond to the master control signal received by ramp generator circuit 1216 of first edge-triggered circuit 1202.

Control signal 1500B of FIG. 15B may be an alternate embodiment of control signal 1500A. Control signal 1500B has period 1502, a duty cycle 1510, rising edge 1506, and a falling edge 1512. In embodiments, control signal 1500B may correspond to the master control signal received by ramp generator circuit 1216 of first edge-triggered circuit 1202. As shown, duty cycle 1510 is different from duty cycle 1504 of control signal 1500A. That is, it contemplated herein that varying duty cycles according to design requirements for a regulator as described herein, such as regulator 106.

Control signal 1500C of FIG. 15C has period 1502, duty cycle 1504, a rising edge 1516, and a falling edge 1514. In embodiments, control signal 1500C may correspond to the master control signal, after being inverted, that is received by ramp generator circuit 1218 of second edge-triggered circuit 1204.

Figure 16:
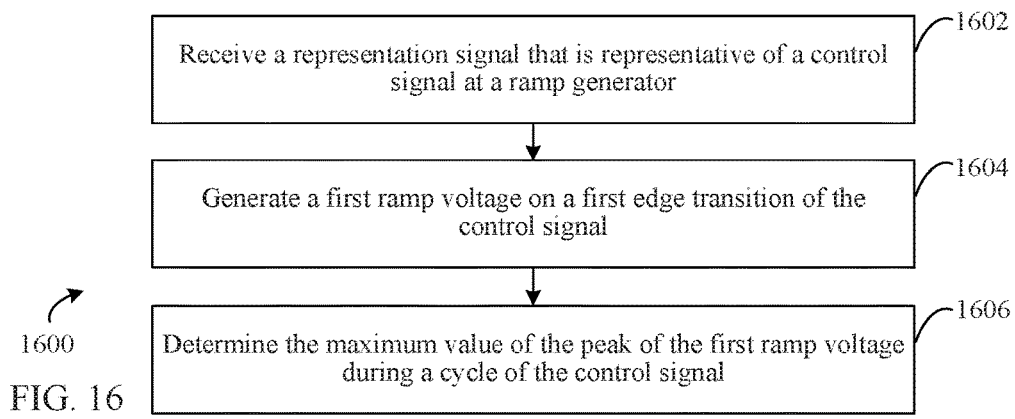
FIG. 16 shows a flowchart for generating a ramp voltage and detecting a peak voltage, according to an example embodiment.

Turning now to FIG. 16, a flowchart 1600 is shown. First edge-triggered circuit 1202, ramp generator circuit 1216, peak detector circuit 1220, second edge-triggered circuit 1204, ramp generator circuit 1218, and peak detector circuit 1222 may each perform their functions according to flowchart 1600. Flowchart 1600 is described as follows.

A representation signal that is representative of a control signal is received at a ramp generator (1602). For instance, as described above, ramp generator circuit 1216 is configured to receive the master control signal from hysteretic control circuit 202a. In embodiments, control signal 1500A of FIG. 15 may be received by ramp generator circuit 1216.

A first ramp voltage is generated on a first edge transition of the control signal (1604). Ramp generator circuit 1216 is configured to trigger the generation of the first ramp voltage upon a transition of the master control signal from a 'low' value to a 'high' value, i.e., a rising edge of the master control signal. For example, ramp generator circuit 1216 may trigger the generation of a ramp voltage signal at rising edge 1506 of control signal 1500A. Similarly, ramp generator circuit 1218 may trigger the generation of a ramp voltage signal at rising edge 1506 of inverted control signal 1500C (or at falling edge 1508 of control signal 1500A).

Figure 17:
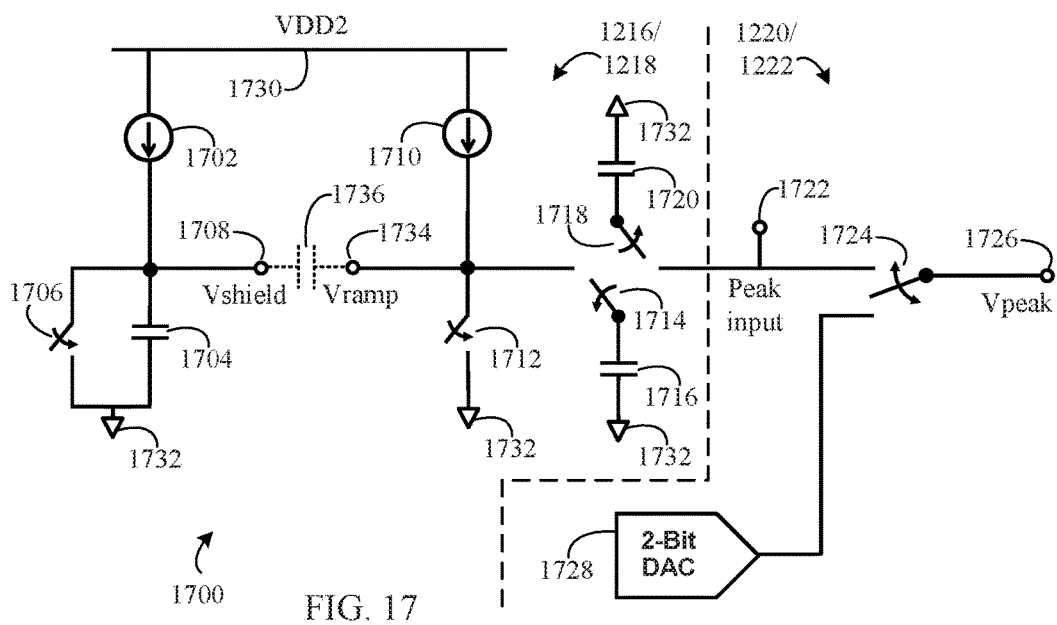
FIG. 17 shows a diagram of a circuit for ramp generation and peak detection, according to an example embodiment.

Turning now to FIG. 17, a circuit diagram of an example circuit 1700 is shown. Circuit 1700 may be a further embodiment of first edge-triggered circuit 1202 and/or second edge-triggered circuit 1204 of FIG. 12. For example, circuit 1700 shows a first circuit portion corresponding to ramp generator circuits 1216/1218, and a second circuit portion corresponding to peak detector circuits 1220/1222.

The first circuit portion includes a first current source 1702 electrically coupled from a second voltage source VDD2 1730 and in series at a shield node 1708 to a first capacitor 1704 in parallel with a first reset switch 1706, each of which are electrically coupled to a ground node VSS 1732. Also included in the first circuit portion is a second current source 1710 electrically coupled from second voltage source VDD2 1730 and in series at a ramp node 1734 to parallel circuitry that comprises a first control switch 1714 in series with a second capacitor 1716 that is electrically coupled to VSS 1732, a second control switch 1718 in series with a third capacitor 1720 that is electrically coupled to VSS 1732, and a second reset switch 1712 that is electrically coupled to VSS 1732. The second circuit portion includes an output switch 1724, a first voltage source 1728 electrically coupled to a first input of output switch 1724, and a peak input node 1722 electrically coupled to a second input of output switch 1724. The output of output switch 1724 is a peak voltage node 1726.

In embodiments, shield node 1708 may be configured to provide capacitive shielding 1736 to ramp node 1734 and its associated routing (e.g., traces and/or electrical connections), and to provide a pre-charge voltage signal to a comparator, such as open-loop comparators 1208a-1208c, at a comparator input to reduce charge kick-back.

While not explicitly shown for illustrative clarity, first control switch 1714 and second control switch 1718 receive an activation signal to open and close. In embodiments, the activation signal may be based on the active edge of a control signal, such as the rising edge of the master control signal from hysteretic control circuit 202a for ramp generator circuit 1216, and the rising edge of the inverted master control signal for ramp generator circuit 1218. Additionally, first reset switch 1706 and second reset switch 1712 may receive the same activation signals as first control switch 1714 and second control switch 1718 where first reset switch 1706 and second reset switch 1712 (by default open or deactivated) will activate (close) only briefly to reset the ramp voltage at ramp node 1734 and then deactivate (open). First control switch 1714, second control switch 1718, first reset switch 1706, second reset switch 1712, and output switch 1724 may be any type of known switch, e.g., single-pole, single-throw (SPST) switches, single-pole, double-throw (SPDT) switches, and/or the like.

Referring again to (1604) of flowchart 1600, where a first ramp voltage is generated on a first edge transition of the control signal, and to circuit 1700, second current source 1710 generates the first ramp voltage at a rising edge of a received control signal. For instance, second current source 1710 in an embodiment of ramp generator circuit 1216 receives the master control signal from hysteretic control circuit 202a, and on a rising edge of the master control circuit (e.g., as shown for control signal 1500A in FIG. 15A), first control switch 1714 is activated to connect to ramp node 1734. This connection allows second current source 1710 to charge second capacitor 1716 and increase the voltage charge thereon (Vramp) at ramp node 1734. At the same time, third capacitor 1720 is activated to connect to peak input node 1722 and to disconnect from ramp node 1734. The voltage charge (Vramp) at ramp node 1734 is provided as a ramp voltage output to switches 1212a-1212c of output circuits 1214a-1214c of FIG. 12. Also at the rising edge of the master control signal, first reset switch 1706 and second reset switch 1712 are briefly activated to reset the voltages at ramp node 1734 and shield node 1708.

A second ramp voltage may likewise be generated by second current source 1710 in an embodiment of ramp generator circuit 1218 that receives the inverted master control signal (e.g., as shown for control signal 1500C in FIG. 15C) from hysteretic control circuit 202a.

The first and second ramp voltages provide a measure of the duty cycle of the master control signal by virtue of their phase delay, i.e., being triggered off the rising edge of the master control signal and the falling edge of the master control signal.

Figure 18:
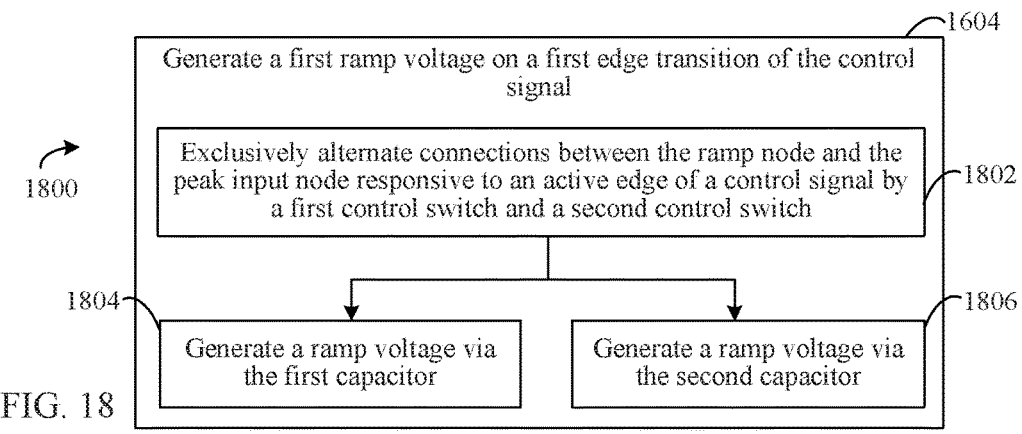
FIG. 18 shows a flowchart for generating a ramp voltage, according to an example embodiment.

In FIG. 18, a flowchart 1800 is shown. First edge-triggered circuit 1202, ramp generator circuit 1216, second edge-triggered circuit 1204, ramp generator circuit 1218, and circuit 1700 may each perform their functions according to flowchart 1800. As shown, flowchart 1800 is a continuing embodiment of (1604) of flowchart 1600. Flowchart 1800 is described as follows.

Exclusively alternate connections between the ramp node and the peak input node responsive to an active edge of a control signal by a first control switch and a second control switch (1802). As described above, first control switch 1714 and second control switch 1718 are configured to alternate connections between ramp node 1734 and peak input node 1722 in an exclusive manner based on an active edge of a control signal, e.g., the master control signal described herein. From (1802), flowchart 1800 may proceed to either of (1804) and (1806).

Generate a ramp voltage via the first capacitor (1804). For example, at a rising edge of the control signal, the voltage value (Vramp) at ramp node 1734 is reset, and first control switch 1714 is connected to ramp node 1734. Second current source 1710 sinks current into second capacitor 1716 generating a ramp voltage at ramp node 1734.

Generate a ramp voltage via the second capacitor (1806). For example, at a rising edge of the control signal, the voltage value (Vramp) at ramp node 1734 is reset, and second control switch 1718 is connected to ramp node 1734. Second current source 1710 sinks current into third capacitor 1720 generating a ramp voltage at ramp node 1734.

As described, ramp voltages generated via second capacitor 1716 and third capacitor 1720 are generated at alternating rising edges of the control signal. As would be understood by persons of skill in the relevant art(s) having the benefit of this disclosure, the initial ramp voltage during operation may be generated via either of second capacitor 1716 and third capacitor 1720.

Referring back again to FIG. 16, flowchart 1600 concludes as follows. The maximum value of the peak of the first ramp voltage is determined during a cycle of the control signal (1608). Peak detector circuit 1220 is configured to hold and provide a peak voltage value of a ramp voltage generated and provided by ramp generator circuit 1216. For instance, as described above, a ramp voltage may be generated by providing a connection between second current source 1710 and second capacitor 1716 via first control switch 1714 at a rising edge the master control signal. At the next subsequent rising edge of the master control signal, second control switch 1718 is activated to provide a connection between second current source 1710 and third capacitor 1720 thereby generating the next ramp voltage, while first control switch 1714 is activated to provide a connection between peak input node 1722 and second capacitor 1716 that now holds a voltage charge that is equal, or approximately equal, to the peak voltage value of the ramp voltage generated in (1604). Output switch 1724 is configured to connect peak node 1726 to peak input node 1722 and thus peak node 1726 is brought to the peak voltage value of the ramp voltage signal. The peak voltage or value thereof may then be provided by peak detector circuit 1220 to divider circuit 1206 as described above. In embodiments, the provided peak voltage and/or its value may be buffered for provision to divider circuit 1206.

It is contemplated herein that according to embodiments, peak detector circuit 1222 may similarly hold and provide a peak voltage value of a ramp voltage generated and provided by ramp generator circuit 1218 in configurations where divider circuit 1206 generates and provides divided values based on the falling edge of the master control signal.

First voltage source 1728 is configured to provide an alternative voltage value for the peak voltage signal. For example, at the startup of a regulator such as regulator 106 or other circuits and/or components described herein, and for light loads, a peak of a ramp voltage signal may not be valid. In such instances, first voltage source 1728 may provide an alternative voltage to peak node 1726 via output switch 1724 until a viable or valid peak voltage threshold value is reached. Accordingly, the voltage value of the peak may be monitored to determine the activation of output switch 1724. In embodiments, the threshold value may be set according to design requirements, e.g., at a in the range of 60 mV-200 mV. First voltage source 1728 may be any known voltage source, including but not limited to, a digital to analog converter (DAC) such as a 2-bit DAC.

First current source 1702 and second current source 1710 may each be any type of current source such as a stand-alone current source circuit. VDD2 1730, a second voltage source, may provide a voltage across resistive components that comprise first current source 1702 and second current source 1710 to generate their respective currents, according to embodiments. VDD2 1730 may be any system voltage such as a voltage of VDD 436 of FIG. 4 or lower voltage converted therefrom. It is contemplated in embodiments that first current source 1702 may generate a second current that is greater than a first current generated by second current source 1710, such as a second current that is double the amperage of the first current.

First capacitor 1704, second capacitor 1716, and third capacitor 1720 may be of any known capacitor type or configuration and have any capacitive values according to design and operational considerations. It is contemplated that second capacitor 1716 and third capacitor 1720 may each have a capacitance value that is larger than first capacitor 1704, e.g., double in value. In embodiments, more or fewer capacitors may be included, including more or fewer capacitors having an equivalent total capacitance.

Figure 19:
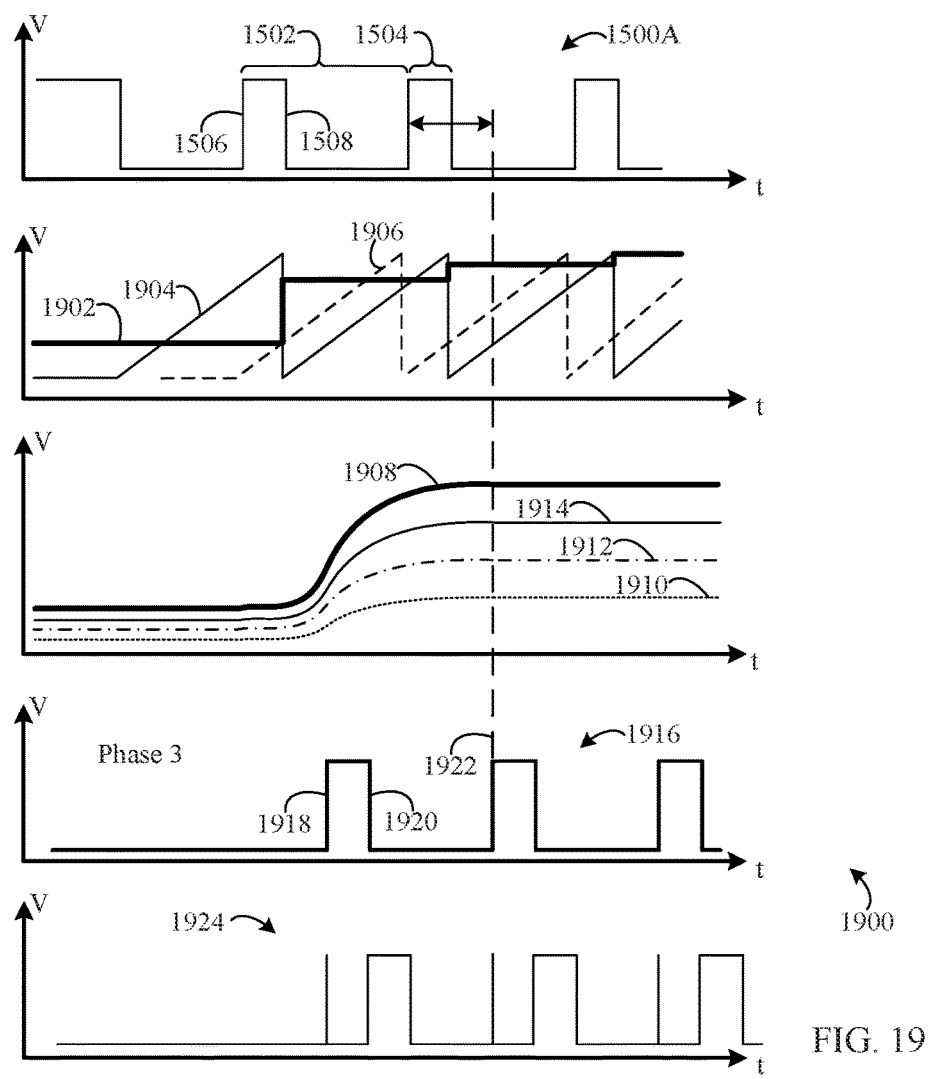
FIG. 19 shows a waveform diagram of signals generated, according to example embodiments.

In FIG. 19, and example waveform diagram 1900 is shown. For reference, control signal 1500A of FIG. 15A is shown in waveform diagram 1900. The described embodiments herein are configured to operate and perform their various functions to produce signals as shown, or similar to those shown, in waveform diagram 1900, although it should be noted that waveform diagram 1900 is exemplary in nature and is shown for illustrative purposes. Waveform diagram 1900 is not to be considered limiting. Waveform diagram 1900 is shown in five parts for illustrative clarity.

Waveform diagram 1900 shows signals for an example regulator, such as regulator 106, having four active phases (a master phase output, and three slave phase outputs). An example third-phase signal of the four phases will be referenced in wave form diagram 1900 (i.e., in Phase 3) as an illustrative output example of a phase-delayed, pulse width modulated signal. Waveform diagram 1900 includes the following signals: control signal 1500A of FIG. 15A, a peak voltage 1902, a falling edge triggered ramp voltage 1904, a rising edge triggered ramp voltage 1906, a buffered peak voltage 1908 (Vpeak), a first divided value 1910 (¼*Vpeak), a second divided value 1912 (½*Vpeak), a third divided value 1914 (¾*Vpeak), and a phase-three output 1916 (i.e., a phase-delayed, pulse width modulated signal) with a corresponding open-loop comparator output 1924.

As described herein, a control signal, e.g., control signal 1500A, may be received from hysteretic control circuit 202a. Falling edge 1508 of control signal 1500A triggers the generation of a ramp voltage such as falling edge triggered ramp voltage 1904, while rising edge 1506 of control signal 1500A triggers the generation of a ramp voltage such as rising edge triggered ramp voltage 1906. As exemplarily illustrated, and in accordance with the described embodiments, peak voltage 1902 is determined based on the peak of falling edge triggered ramp voltage 1904. In the initial cycles of control signal 1500A, the determined peak voltage 1902 may be less than the actual peak value of falling edge triggered ramp voltage 1904. At the second falling edge 1508 of control signal 1500A, peak voltage 1902 may be determined, and falling edge triggered ramp voltage 1904 may be reset.

Buffered peak voltage 1908 is provided to divider circuit 1206. Divider circuit 1206 is configured to generate first divided value 1910 (¼*Vpeak), second divided value 1912 (½*Vpeak), and third divided value 1914 (¾*Vpeak) and respectively provide the divided values as trip-point voltages to open-loop comparators 1208a-1208c. In subsequent cycles of control signal 1500a, peak voltage 1902 approaches the actual peak value of falling edge triggered ramp voltage 1904. Consequently, buffered peak voltage 1908, first divided value 1910, second divided value 1912, and third divided value 1914 also approach their targeted or designed values for operation.

Phase-three output 1916, being the third of four total phases, is generated with a phase delay 1922 that is equal to half of period 1502 of control signal 1500A. Phase-three output 1916 has a rising edge 1918 and a falling edge 1920 commensurate with duty cycle 1504 of control signal 1500A. Comparator output 1924 corresponds to phase-three output 1916 as is shown for reference.

IV. Further Example Embodiments and Advantages

As noted above, systems, circuits, and devices, including multi-phase hysteretic buck switching regulators, may be configured in various ways to perform multi-phase voltage conversions. For instance, in embodiments, a voltage conversion is performed by a multi-phase hysteretic buck switching regulator having a single hysteretic control loop and open-loop comparator configurations for slave phases according to the techniques and embodiments herein. A single hysteretic control loop for a plurality of phases improves power efficiency by allowing slave phases to have minimal active circuitry.

The described techniques and embodiments provide for a configurable number of output phases, e.g., via software and/or hardware control, where output phases can be configured dynamically to facilitate conversion efficiency optimizations, and unused phases, e.g., a fourth phase in a configuration with three active phases, can operate as independent switchers. The described multi-phase, variable delay generator provides for open-loop comparator configurations used in delay generation that obviates monitoring for closed-loop feedback stability and output voltage regulation loops.

The described techniques and embodiments also provide for high output current capability (e.g., 2 A per output phase, or more), allow for low supply bias current overhead (e.g., approximately 25% of bias current consumed by existing solutions) to improve battery life and low area overhead, as well as for improved current matching between phases to enable greater high-load efficiency.

Regulators according to the described techniques and embodiments allow for more robust systems by reducing ripple of output voltages through the described time-spaced phasing architecture (e.g., at output node Vout 210 of FIG. 4, the output node common to the output side of inductors 416a-416n and to capacitor 428, capacitor 430, capacitor 432, and capacitor 434). The hysteretic control techniques provide for improved transient response, and the buck switching elements improve voltage conversion efficiency.

Regulators according to the described techniques and embodiments also allow for scalability and use in varied applications having different power needs. Variations in implementation configurations, as shown herein, offer a highly flexible regulator solution. For example, a single multi-phase hysteretic buck switching regulator may be configured as a two-phase, 4 A switcher and two single phase, 2 A switchers (i.e., three separate power rails), a four-phase, 8 A switcher (i.e., a single high power rail), or a three-phase, 6 A switcher and a single phase, 2 A switcher (i.e., two separate power rails).

The described multi-phase implementations also provide for reduced circuit costs over large, single-phase switchers by using multiple output inductors that are smaller and cheaper overall.

The described techniques and embodiments may be utilized in any PMU or as stand-alone regulator components, and the advantages described herein may become even more beneficial as electronic device functionality and power consumption grows (e.g., CPU power for mobile devices). The described techniques and embodiments provide value and performance benefits to products and industries that drive for increasing amounts of performance from processors with limited battery power.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The further example embodiments and advantages described in this Section may be applicable to embodiments disclosed in any other Section of this disclosure.

Embodiments and techniques, including methods, described herein may be performed in various ways such as, but not limited to, being implemented by hardware, or hardware combined with one or both of software and firmware. For example, embodiments may be implemented as circuit board module PMUs with one or more multi-phase hysteretic buck switching regulators, specifically customized hardware, ASICs, electrical circuitry, and/or the like.

V. Example Processing Device Implementations

Multi-phase hysteretic buck switching regulator embodiments described herein, such as regulator 106, along with any respective components/subcomponents thereof, and/or any flowcharts, further systems, sub-systems, components, and/or embodiments disclosed herein may be implemented in hardware (e.g., hardware logic/electrical circuitry), or any combination of hardware with one or both of software (computer program code or instructions configured to be executed in one or more processors or processing devices) and firmware. In embodiments with respect to the example computer implementations in this Section, main memory, memory cards and memory sticks, memory devices, and/or the like may include and or implement the described techniques and embodiments.

Figure 20:
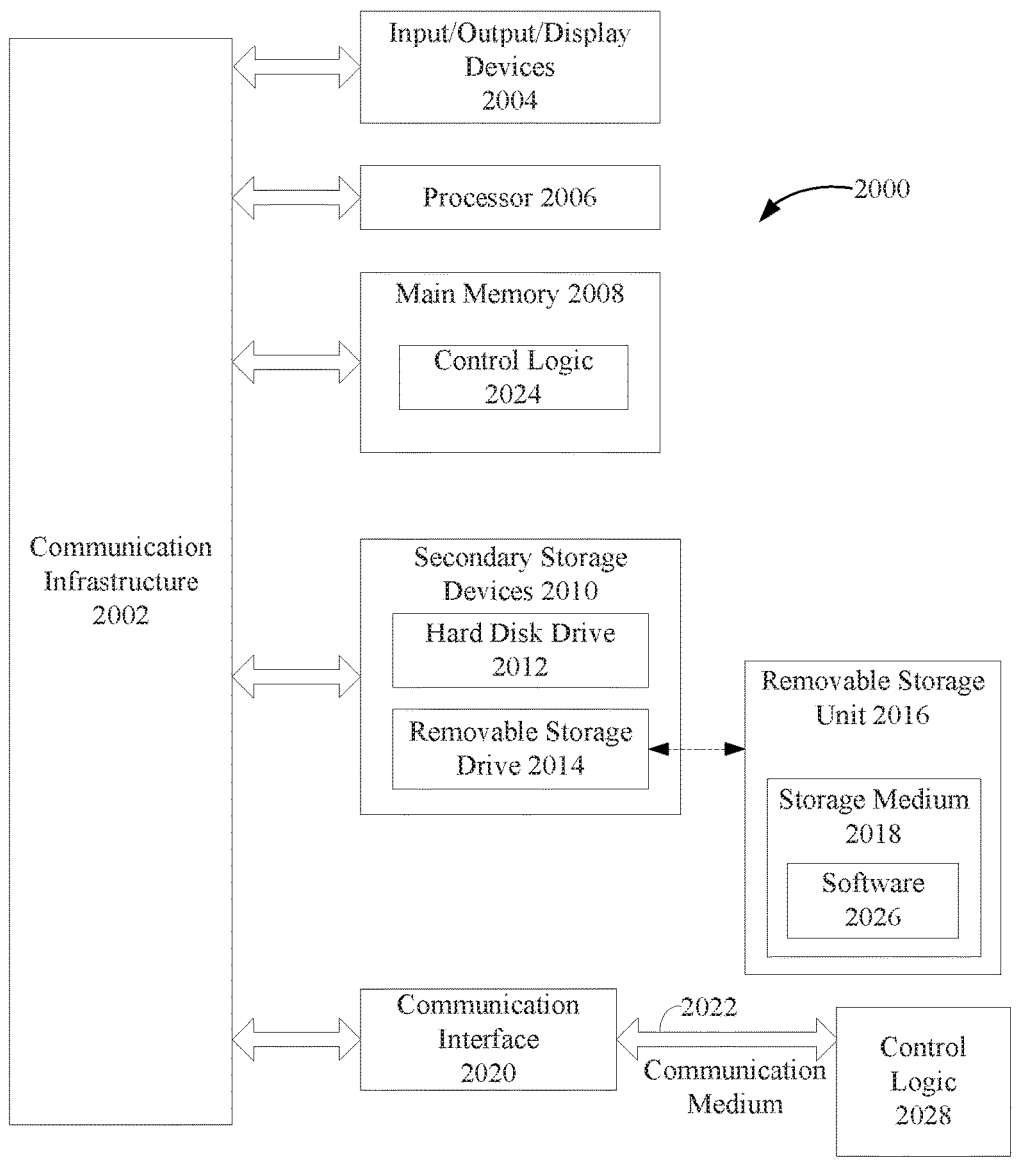
FIG. 20 shows a block diagram of a processing device/system in which the techniques disclosed herein may be performed and the embodiments herein may be utilized.

The embodiments described herein, including circuitry, devices, systems, methods/processes, and/or apparatuses, may be implemented in or using well known processing devices, communication systems, servers, and/or, computers, such as a processing device 2000 shown in FIG. 20. It should be noted that processing device 2000 may represent mobile devices, communication devices/systems, entertainment systems/devices, processing devices, and/or traditional computers in one or more embodiments. For example, a multi-phase hysteretic buck switching regulator as described herein, and any of the sub-systems and/or components respectively contained therein and/or associated therewith, may be implemented in or using one or more processing devices 2000 and/or similar computing devices.

Processing device 2000 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Processing device 2000 may be any type of computer, including a desktop computer, a server, etc., and may be a computing device or system within another device or system.

Processing device 2000 includes one or more processors (also called central processing units, or CPUs), such as a processor 2006. Processor 2006 is connected to a communication infrastructure 2002, such as a communication bus. In some embodiments, processor 2006 can simultaneously operate multiple computing threads, and in some embodiments, processor 2006 may comprise one or more processors.

Processing device 2000 also includes a primary or main memory 2008, such as random access memory (RAM). Main memory 2008 has stored therein control logic 2024 (computer software), and data.

Processing device 2000 also includes one or more secondary storage devices 2010. Secondary storage devices 2010 include, for example, a hard disk drive 2012 and/or a removable storage device or drive 2014, as well as other types of storage devices, such as memory cards and memory sticks. For instance, processing device 2000 may include an industry standard interface, such a universal serial bus (USB) interface for interfacing with devices such as a memory stick. Removable storage drive 2014 represents a floppy disk drive, a magnetic tape drive, a compact disk drive, an optical storage device, tape backup, etc.

Removable storage drive 2014 interacts with a removable storage unit 2016. Removable storage unit 2016 includes a computer useable or readable storage medium 2018 having stored therein computer software 2026 (control logic) and/or data. Removable storage unit 2016 represents a floppy disk, magnetic tape, compact disk, DVD, optical storage disk, or any other computer data storage device. Removable storage drive 2014 reads from and/or writes to removable storage unit 2016 in a well-known manner.

Processing device 2000 also includes input/output/display devices 2004, such as touchscreens, LED and LCD displays, monitors, keyboards, pointing devices, etc.

Processing device 2000 further includes a communication or network interface 2020. Communication interface 2020 enables processing device 2000 to communicate with remote devices. For example, communication interface 2020 allows processing device 2000 to communicate over communication networks or mediums 2022 (representing a form of a computer useable or readable medium), such as LANs, WANs, the Internet, etc. Network interface 2020 may interface with remote sites or networks via wired or wireless connections.

Control logic 2028 may be transmitted to and from processing device 2000 via the communication medium 2022.

Any apparatus or manufacture comprising a computer useable or readable medium having control logic (software) stored therein is referred to herein as a computer program product or program storage device. This includes, but is not limited to, processing device 2000, main memory 2008, secondary storage devices 2010, and removable storage unit 2016. Such computer program products, having control logic stored therein that, when executed by one or more data processing devices, cause such data processing devices to operate as described herein, represent embodiments.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media and signals transmitted over wired media. Embodiments are also directed to such communication media.

The techniques and embodiments described herein may be implemented as, or in, various types of circuits, devices, apparatuses, and systems. For instance, embodiments may be included, without limitation, in processing devices (e.g., illustrated in FIG. 20) such as computers and servers, as well as communication systems such as switches, routers, gateways, and/or the like, communication devices such as smart phones, home electronics, gaming consoles, entertainment devices/systems, etc. A device, as defined herein, is a machine or manufacture as defined by 35 U.S.C. §101. That is, as used herein, the term "device" refers to a machine or other tangible, manufactured object and excludes software and signals. Devices may include digital circuits, analog circuits, or a combination thereof. Devices may include one or more processor circuits (e.g., central processing units (CPUs), processor 2006 of FIG. 20), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

VI. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A multi-phase hysteretic buck switching regulator, comprising:
   a master phase circuit configured to generate a master converted voltage in phase with a received master control signal at an output node;
   a variable delay generator configured to receive the master control signal and generate at least one pulse width modulated signal that is a representation of the master control signal; and
   at least one slave phase circuit, each slave phase circuit of the at least one slave phase circuit configured to:
      receive a corresponding pulse width modulated signal generated by the variable delay generator; and
      generate a corresponding slave converted voltage in phase with its corresponding pulse width modulated representation at the output node.

2. The multi-phase hysteretic buck switching regulator of claim 1, further comprising:
   a hysteretic control circuit configured to provide the master control signal.

3. The multi-phase hysteretic buck switching regulator of claim 2, wherein the hysteretic control circuit comprises one or more of:
   a hysteretic comparator configured to generate the master control signal; and
   a digital to analog converter (DAC) configured to generate a reference voltage as a second input to the hysteretic comparator;
   wherein the master phase circuit comprises a passive feedback network configured to generate an output voltage feedback signal as a first input to the hysteretic comparator.

4. The multi-phase hysteretic buck switching regulator of claim 3, further comprising:
   a plurality of driver circuits, each driver circuit comprising:
      a first driver-transistor pair and a second driver-transistor pair having a common driver output; and
   a plurality of non-overlap generator circuits, each non-overlap generator circuit being configured to:
      receive a control signal;
      generate a first phase control signal and a second phase control signal from the control signal; and
      provide the first phase control signal to the first driver-transistor pair and the second phase control signal to the second driver-transistor pair;
   each driver circuit being configured to:
      receive a system voltage signal;
      generate a buffered voltage signal based on the first phase control signal, the second phase control signal, and the system voltage signal; and
      provide the buffered voltage signal.

5. The multi-phase hysteretic buck switching regulator of claim 4, wherein the master phase circuit comprises:
   a first non-overlap generator circuit of the plurality of non-overlap generator circuits, wherein the control signal received is the master control signal; and
   a first driver circuit of the plurality of driver circuits, wherein the voltage buffer signal is provided to a passive feedback network and to the output node via a master phase inductor; and
   wherein the at least one slave phase circuit comprises:
   a second non-overlap generator circuit of the plurality of non-overlap generator circuits, wherein the control signal received is a first pulse width modulated signal of the at least one pulse width modulated signal; and
   a second driver circuit of the plurality of driver circuits, wherein the voltage buffer signal is provided to the output node via a first slave phase inductor in parallel with the master phase inductor.

6. The multi-phase hysteretic buck switching regulator of claim 1, wherein each of the at least one slave phase circuit includes a passive feedback network configured to be activated to transition to a master phase mode and deactivated to transition to a slave phase mode.

7. The multi-phase hysteretic buck switching regulator of claim 1, wherein the at least one slave phase circuit comprises three slave phase circuits, each slave phase circuit configured to be dynamically activated and dynamically deactivated.

8. The multi-phase hysteretic buck switching regulator of claim 1, wherein the master phase circuit and the at least one slave phase circuit are included in a power management unit (PMU) of an electronic device and are electrically coupled to a battery of the electronic device, and
   wherein the master phase circuit and at least one slave phase circuit are configured to convert a voltage of the battery into a voltage of a processor of the electronic device at the output node.

9. A variable delay generator, comprising:
   divider circuitry configured to:
      receive a maximum value of a peak of a ramp voltage; and divide the maximum value of the peak of the ramp voltage based on a number of output phases to generate one or more divided values; and output circuitry comprising one or more comparators, each comparator being in an open-loop configuration and configured to:

generate a phase-shifted signal that is a representation of a control signal based on the one or more divided values and a comparator ramp voltage for either of a falling edge or a rising edge of the control signal.

10. The variable delay generator of claim 9, further comprising:

ramp generator circuitry configured to:

receive a representation signal that is representative of the control signal; and generate a first ramp voltage on a first edge transition of the control signal; peak detector circuitry configured to:

determine the maximum value of the peak of the first ramp voltage during a cycle of the control signal.

11. The variable delay generator of claim 10, wherein the ramp generator circuitry is configured to:

generate a second ramp voltage on a second edge transition of the control signal based on an inverse representation signal that is representative of an inverse of the control signal; and wherein the peak detector circuitry is configured to:

receive the inverse representation signal; and determine a maximum value of a peak of the second ramp voltage during the cycle of the control signal.

12. The variable delay generator of claim 11, wherein the output circuitry further comprises:

one or more state machines, each state machine respectively coupled to a comparator of the one or more comparators, and each state machine configured to:

monitor the phase-shifted signal that is generated; and select the first ramp voltage or the second ramp voltage to be the comparator ramp voltage.

13. The variable delay generator of claim 12, wherein the output circuitry further comprises:

one or more switches, each switch respectively coupled to a comparator of the one or more comparators, and configured to:

receive the first ramp voltage and the second ramp voltage as switch inputs;

receive an activation signal from the one or more state machines; and provide the first ramp voltage or the second ramp voltage based on the activation signal.

14. The variable delay generator of claim 9, wherein the number of output phases is four; and wherein the output circuitry comprises three open-loop comparators that include:

a first open-loop comparator configured to generate a first phase-shifted signal with a one-fourth period phase delay relative to the control signal;

a second open-loop comparator configured to generate a second phase-shifted signal with a one-half period phase delay relative to the control signal; and a third open-loop comparator configured to generate a third phase-shifted signal with a three-fourths period phase delay relative to the control signal.

15. The variable delay generator of claim 9, wherein the control signal is a master clock signal generated by a hysteretic control circuit.

16. A device, comprising:

at least one circuit that includes:

peak detector circuitry comprising;

an output switch configured to provide a peak voltage signal;

a first voltage source electrically coupled to a first input of the output switch; and a peak input node electrically coupled to a second input of the output switch; and ramp generator circuitry comprising:

a first current source electrically coupled in series at a shield node to a first capacitor in parallel with a first reset switch; and a second current source electrically coupled in series at a ramp node to parallel circuitry comprising:

a first control switch in series with a second capacitor;

a second control switch in series with a third capacitor; and a second reset switch;

the first control switch and the second control switch configured to exclusively alternate connections between the ramp node and the peak input node responsive to an active edge of a control signal; and the second current source configured to generate a ramp voltage via the first capacitor and the second capacitor.

17. The device of claim 16, wherein the at least one circuit comprises a first circuit and a second circuit;

the first circuit configured to receive a master clock signal as the control signal; and the second circuit configured to receive an inverse representation signal that is representative of an inverse of the master clock signal as the control signal.

18. The device of claim 16, wherein the shield node is configured to:

provide capacitive shielding to the ramp node, and provide a pre-charge voltage signal to a comparator.

19. The device of claim 16, wherein the first reset switch and the second reset switch are configured to activate at a first edge of the control signal.

20. The device of claim 16, wherein the first voltage source is a digital to analog converter (DAC) configured to provide an alternative voltage value for the peak voltage signal.

* * * * *